(12) United States Patent
Yogeeswaran et al.

(10) Patent No.: US 10,613,289 B2
(45) Date of Patent: Apr. 7, 2020

(54) APPARATUSES, SYSTEMS, AND METHODS FOR INSTALLING FIBER OPTIC CABLE USING PREEXISTING ELECTRICAL POWER INFRASTRUCTURE

(71) Applicant: Facebook, Inc., Menlo Park, CA (US)

(72) Inventors: Karthik Yogeeswaran, San Francisco, CA (US); Scott C. Wiley, Los Altos, CA (US); James A. Mass, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/228,746

(22) Filed: Dec. 20, 2018

(65) Prior Publication Data

US 2019/0250359 A1    Aug. 15, 2019

Related U.S. Application Data

(60) Provisional application No. 62/628,792, filed on Feb. 9, 2018.

(51) Int. Cl.
| | | |
|---|---|---|
| *G02B 6/00* | (2006.01) | |
| *G02B 6/48* | (2006.01) | |
| *B65H 75/14* | (2006.01) | |
| *G02B 6/44* | (2006.01) | |

(52) U.S. Cl.
CPC .......... *G02B 6/486* (2013.01); *B65H 75/14* (2013.01); *G02B 6/4457* (2013.01); *B65H 2701/32* (2013.01)

(58) Field of Classification Search
CPC ...... G02B 6/486; G02B 6/4457; B65H 75/14; B65H 2701/32
See application file for complete search history.

(56) References Cited

U.S. PATENT DOCUMENTS

| | | | | |
|---|---|---|---|---|
| 4,833,871 A | * | 5/1989 | Ogawa ................ | G02B 6/4407 385/105 |
| 5,727,373 A | | 3/1998 | Appleford et al. | |
| 6,000,209 A | * | 12/1999 | Ito ........................ | G02B 6/4491 57/293 |
| 6,813,422 B1 | | 11/2004 | Krishnamurthy et al. | |
| 8,831,394 B2 | | 9/2014 | Kimbrell et al. | |

(Continued)

OTHER PUBLICATIONS

AFL Telecommunications Europe Ltd., "AccessWrap", retrived on www.AFLglobal.com, 1 page.

(Continued)

*Primary Examiner* — Ellen E Kim
(74) *Attorney, Agent, or Firm* — FisherBroyles, LLP

(57) ABSTRACT

The disclosed system may include (1) a spool that carries a length of fiber optic cable to be installed on a powerline conductor, where the spool defines multiple axes of rotation, and (2) a motion subsystem that carries the spool, where the motion subsystem (a) causes the system to travel along the powerline conductor, (b) revolves the spool helically about the powerline conductor at a first rate related to a second rate at which the system travels along the powerline conductor, and (c) rotates the spool about the multiple axes of rotation while revolving the spool helically about the powerline conductor to helically wrap the fiber optic cable about the powerline conductor. Various other systems, apparatuses, and methods are also disclosed.

20 Claims, 24 Drawing Sheets

(56) References Cited

U.S. PATENT DOCUMENTS

| | | | |
|---|---|---|---|
| 8,919,092 B2* | 12/2014 | Figenschou | D07B 3/005 |
| | | | 57/293 |
| 9,051,153 B2 | 6/2015 | Lichoulas et al. | |
| 2003/0006332 A1* | 1/2003 | Appleby | G02B 6/4479 |
| | | | 242/362.2 |
| 2017/0176703 A1 | 6/2017 | Baker et al. | |
| 2018/0074214 A1* | 3/2018 | Magne | G01T 1/10 |

OTHER PUBLICATIONS

AFL Telecommunications Europe Ltd., "SkyWrap Information", retrived on www.AFLglobal.com, 2 pages.
AFL Telecommunications Europe Ltd., "Fiber Optic Cable", SkyWrap, retrieved at www.AFLglobal.com, 2 pages.

* cited by examiner

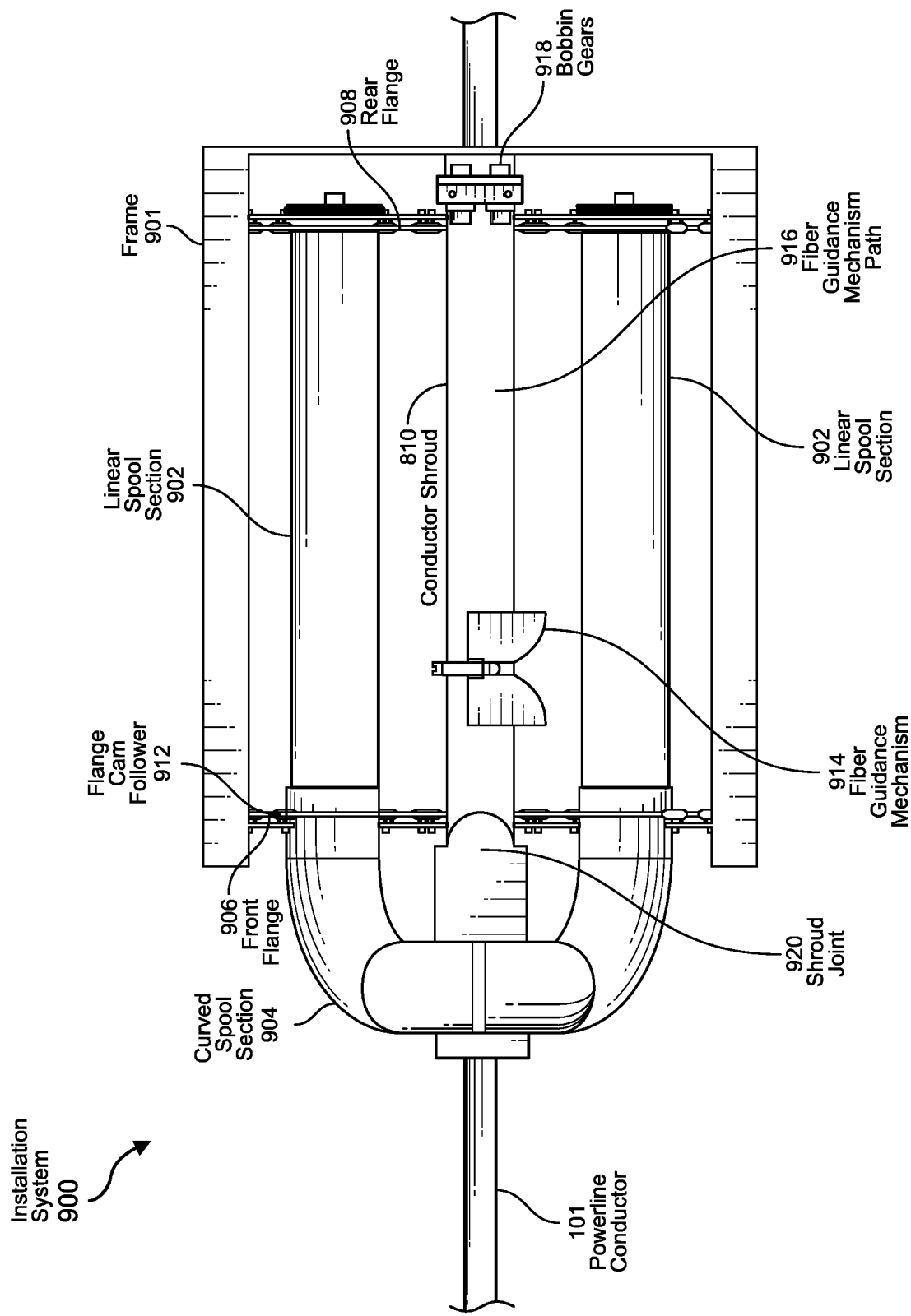

APPARATUSES, SYSTEMS, AND METHODS FOR INSTALLING FIBER OPTIC CABLE USING PREEXISTING ELECTRICAL POWER INFRASTRUCTURE

CROSS REFERENCE TO RELATED APPLICATION

This application claims the benefit of U.S. Provisional Application No. 62/628,792, filed 9 Feb. 2018, the disclosure of which is incorporated, in its entirety, by this reference.

BACKGROUND

Preexisting infrastructure of electrical transmission and/or distribution systems, such as utility poles, electrical cables, and the like, is sometimes employed for carrying fiber optic communication cables, thereby reducing or eliminating the need to acquire separate utility easements or build separate cable-carrying infrastructure. This technology, sometimes termed "aerial outside plant (aerial OSP)" technology, often involves attaching the fiber optic cable to the utility poles (e.g., using either a self-supporting cable or lashing the fiber optic cable to a separate messenger cable) in an unused communication space along the poles between the electrical power lines and ground level (e.g., as determined by various regulations). In other examples, the fiber optic cable may be attached to a preexisting fiber optic cable or electrical powerline cable, such as by way of helically wrapping the fiber optic cable about the preexisting cable.

In examples in which a fiber optic cable is to be helically wrapped about a preexisting electrical powerline cable, a large robotic device may be employed to wrap the fiber optic cable on a large electrical transmission line as the robot travels along that line from one transmission tower to another. While the larger transmission lines span greater distances between towers than smaller electrical distribution lines, distribution lines are typically more plentiful, thus potentially providing much greater overall areal coverage. However, the smaller distribution lines typically possess a lower weight bearing capacity, provide less clearance between powerline conductors, and present a greater number of obstacles (e.g., insulators, power taps, and the like) than their transmission line counterparts, thus presenting significant barriers to the use of traditional robotic technologies for fiber optic cable installation.

SUMMARY

As will be described in greater detail below, the instant disclosure describes apparatuses, systems, and method for installing fiber optic cable using preexisting electrical power infrastructure. As detailed below, the disclosed apparatuses, systems, and methods may provide advantages over conventional approaches, such as applicability to a greater number of electrical powerline conductors, such as electrical distribution lines, thus making installation of the fiber optic cable potentially more widespread and cost-effective.

In one example, a system may include (1) a spool that carries a length of fiber optic cable to be installed on a powerline conductor, where the spool defines multiple axes of rotation, and (2) a motion subsystem that carries the spool, where the motion subsystem (a) causes the system to travel along the powerline conductor, (b) revolves the spool helically about the powerline conductor at a first rate related to a second rate at which the system travels along the powerline conductor, and (c) rotates the spool about the multiple axes of rotation while revolving the spool helically about the powerline conductor to helically wrap the fiber optic cable about the powerline conductor. In some embodiments, the motion subsystem may rotate the spool about the multiple axes of rotation to maintain a predetermined tension on the fiber optic cable while helically wrapping the fiber optic cable about the powerline conductor. Also, in some examples, at least one of the multiple axes of rotation may be parallel to at least a portion of the powerline conductor currently being travelled along by the system.

In some embodiments, the motion subsystem may rotate about the powerline conductor as the motion subsystem causes the system to travel along the powerline conductor to revolve the spool about the powerline conductor. In other examples, the motion subsystem may revolve the spool about the powerline conductor while the motion subsystem maintains a single orientation relative to the powerline conductor.

In some examples, the spool may include a helically-shaped spool extending along the powerline conductor and defining a helical curve about the powerline conductor. Further, in some embodiments, the helical curve may span at least 180 degrees about the powerline conductor. In some examples, the spool may include (1) a flange at each end of the spool to retain the fiber optic cable on the spool, and (2) a plurality of discs coupling the flanges together, where (a) the plurality of discs are oriented parallel to each other and perpendicular to the powerline conductor, and (b) centers of the plurality of discs define the helical curve about the powerline conductor. Further, in some embodiments, the plurality of discs may be coupled together such that rotating a first one of the plurality of discs causes others of the plurality of discs to rotate at a same rate as the first one of the plurality of discs.

In some embodiments, the spool may include at least one linear spool section oriented parallel to the powerline conductor. Moreover, in some examples, the spool may include (1) a first linear spool section oriented parallel to the powerline conductor, (2) a second linear spool section oriented parallel to the powerline conductor and located opposite the powerline conductor from the first linear spool section, and (3) a center curved spool section coupling a first end of the first linear spool section to a first end of the second linear spool section. Further, in some embodiments, the motion subsystem may cause the system to travel along the powerline conductor in a direction corresponding to the center curved spool section. In some examples, (1) the first linear spool section may include (a) a first flange connected to the first end of the first linear spool section, and (b) a second flange connected to a second end of the first linear spool section opposite the first end of the first linear spool section, (2) the second linear spool section may include (a) a third flange connected to the first end of the second linear spool section, and (b) a fourth flange connected to a second end of the second linear spool section opposite the first end of the second linear spool section, and (3) the system may further include a frame, where the first and second linear spool sections are rotatably coupled to the frame via the first, second, third, and fourth flanges. In such examples, (1) the center curved spool section may be fixably coupled to the first end of each of the first and second linear spool sections, and (2) the motion subsystem may rotate the first and second linear spool sections at a same rotational rate in opposing directions. Also, in some embodiments, (1) the first flange may define a first gap through which the fiber optic cable is passed between the first linear spool section and the center curved spool section, and (2) the third flange may define a second gap through which the fiber optic cable is passed between the second linear spool section and the center curved spool section. Moreover, in some examples, the system may include (1) a first fiber guide helically wound about the center curved spool section to guide the fiber optic cable over the center curved spool section from the first linear spool section to the second linear spool section, and (2) a second fiber guide helically wound about the center curved spool section to guide the fiber optic cable over the center curved spool section from the second linear spool section to the first linear spool section, where the first and second fiber guides are helically wound about the center curved spool section in opposing directions.

In another example, a system may include (1) a motion subsystem that causes the system to travel along a powerline conductor, and (2) a coupler that releasably couples, to the motion subsystem, a spool that carries a length of fiber optic cable to be installed on the powerline conductor, where the spool defines multiple axes of rotation, and (3) where the motions subsystem, when the spool is coupled to the motion subsystem, (a) revolves the spool helically about the powerline conductor at a first rate related to a second rate at which the system travels along the powerline conductor, and (b) rotates the spool about the multiple axes of rotation while revolving the spool helically about the powerline conductor to helically wrap the fiber optic cable about the powerline conductor. In some embodiments, the motion subsystem may revolve the spool relative to the motion subsystem to revolve the spool about the powerline conductor. In other examples, the motion subsystem may rotate relative to the powerline conductor to revolve the spool about the powerline conductor.

In another example, a method may include (1) carrying a spool loaded with a length of fiber optic cable to be installed on a powerline conductor along the powerline conductor, where the spool defines multiple axes of rotation, (2) revolving the spool helically about the powerline conductor at a first rate related to a second rate at which the spool is carried along the powerline conductor, and (3) rotating the spool about the multiple axes of rotation while revolving the spool helically about the powerline conductor to helically wrap the fiber optic cable about the powerline conductor.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 9A, 9B, 9C, and 9D are different views of an exemplary installation system including a multiple-section spool and an associated motion subsystem for installing fiber optic cable about a powerline conductor.

Figure 1:
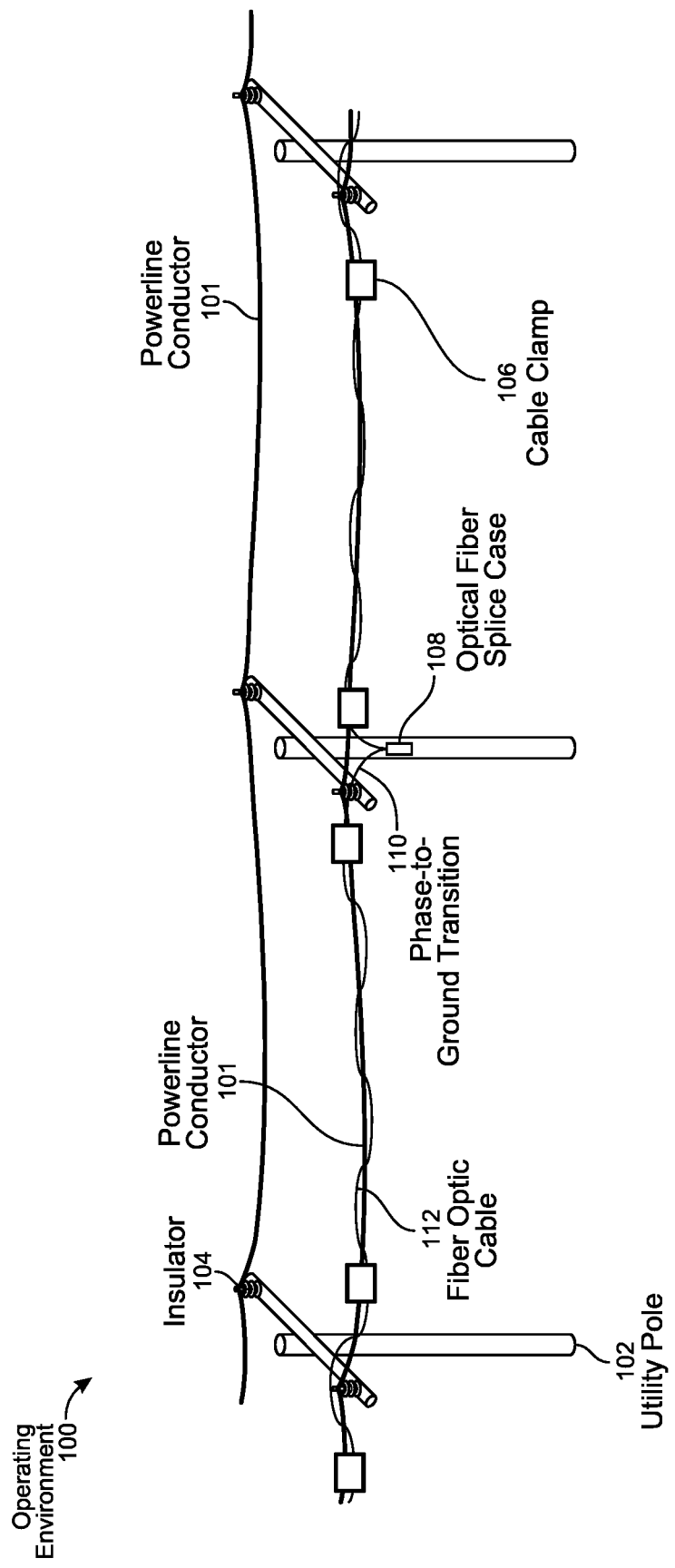
FIG. 1 is a view of an exemplary operating environment in which various exemplary embodiments may be employed.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to installing fiber optic cable using preexisting electrical power infrastructure, such as a powerline conductor. As will be explained in greater detail below, embodiments of the instant disclosure may employ a fiber optic cable spool, or spooling subsystem, that, when employed as part of a fiber wrapping system, may be volumetrically efficient as well as possibly provide a center of mass that is located close to the powerline conductor about which the spooled fiber optic cable is being wrapped. In some examples, aligning the center of mass of the spool near the powerline conductor may minimize the mechanical work involved in revolving the spool about the powerline conductor without employing additional weight or ballast to counterbalance the spool.

Figure 2:
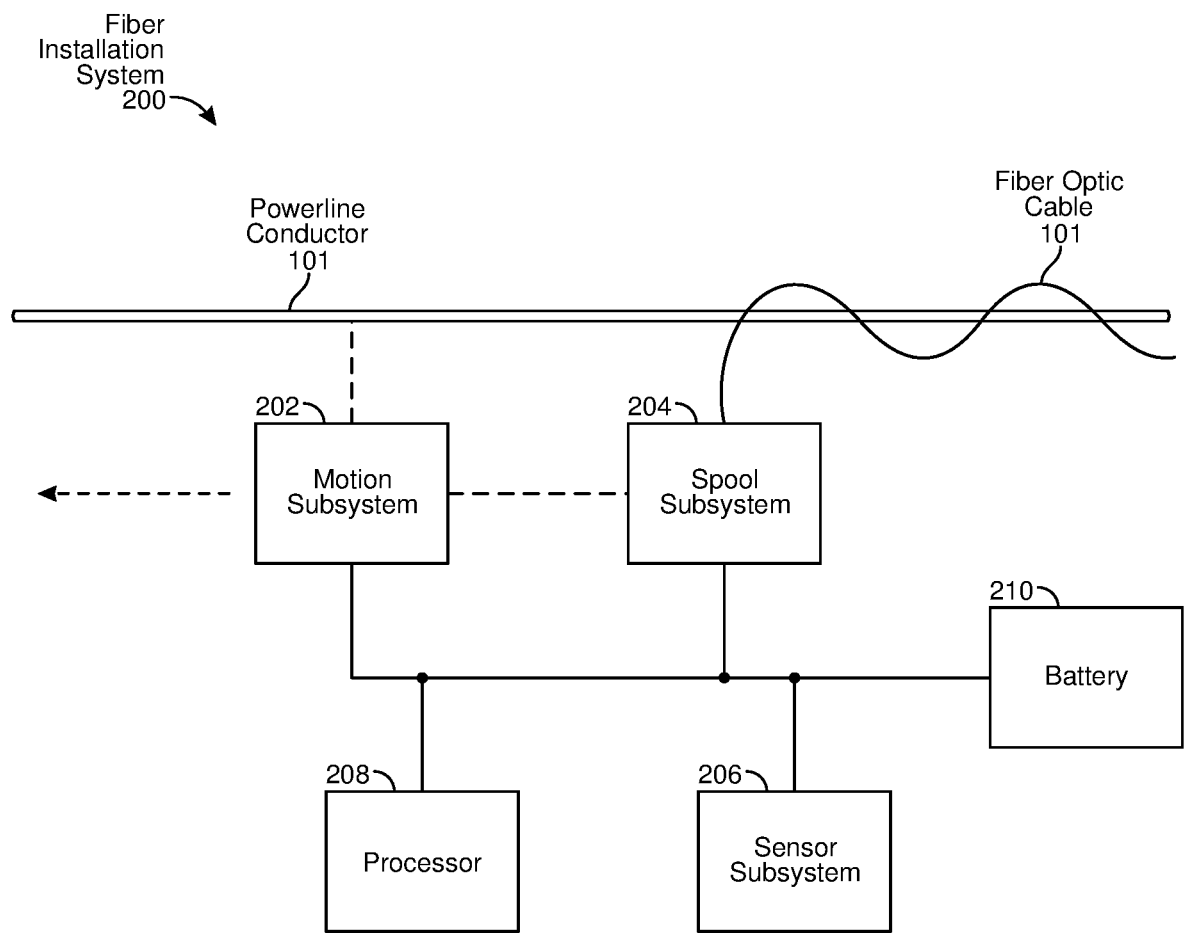
FIG. 2 is a block diagram of an exemplary system for installing fiber optic cable using preexisting electrical power infrastructure, such as a powerline conductor.

The following will provide, with reference to FIGS. 1-10, detailed descriptions of apparatuses, systems, and methods for installing fiber optic cable using preexisting electrical power infrastructure. A brief description of an exemplary operating environment in which the various embodiments described herein may operate is presented in connection with FIG. 1. An exemplary system for installing fiber optic cable is discussed in conjunction with FIG. 2. An exemplary serpentine spool for carrying a length of fiber optic cable, usable as part of the system of FIG. 2, is discussed in connection with the varying views in FIGS. 3A-3C. Four different, more specific embodiments of the serpentine spool of FIGS. 3A-3C are discussed in conjunction with FIGS. 4A-4C, FIGS. 5A-5C, FIGS. 6A-6C, and FIGS. 7A and 7B, respectively. Also described below is an exemplary installation system, with respect to FIGS. 8A-8D, that may employ the exemplary serpentine spool of FIGS. 3A-3C, and the various embodiments thereof, for installing fiber optic cable about a powerline conductor. A discussion of another exemplary installation system that may employ an exemplary multiple-section spool is presented in connection with the various views of FIGS. 9A-9D. A description of an exemplary method of installing fiber optic cable about a powerline conductor is set forth in conjunction with FIG. 10.

FIG. 1 is a graphical representation of an exemplary operating environment 100 in which various apparatuses, systems, and methods disclosed herein may be utilized. As depicted in the example of FIG. 1, operating environment 100 may include an electrical power transmission or distribution system having a plurality of utility poles 102 carrying multiple powerline conductors 101. While any number of powerline conductors 101 may be carried via utility poles 102, two powerline conductors 101 are illustrated in FIG. 1 for visual simplicity. In some examples, powerline conductors 101 are mechanically coupled to utility poles 102 via insulators 104, although other types of components (e.g., taps, standoffs, etc.) may be employed in various embodiments. While specific reference is made herein to utility poles 102, any type of utility pole, H-frame, lattice tower, or other type of pole or tower that carries or supports one or more powerline conductors 101 may be included and covered in various embodiments of operating environment 100 discussed below. Additionally, powerline conductors 101 may include one or more phase conductors, ground wires, static wires, or other conductors supported by utility poles 102, towers, or the like.

Also shown in FIG. 1 is fiber optic cable 112 aligned with, and mechanically coupled to, powerline conductor 101. In some embodiments, fiber optic cable 112 may be helically wrapped about powerline conductor 101, such as by way of a human-powered or electrically-powered robotic device. However, other physical relationships between powerline conductor 101 and fiber optic cable 112 are also possible. While only one fiber optic cable 112 is depicted in FIG. 1, multiple powerline conductors 101 employing the same utility poles 102 may each have a corresponding fiber optic cable 112 attached or otherwise coupled thereto. As depicted in FIG. 1, fiber optic cable 112 may be secured to powerline conductor 101 via one or more cable clamps 106. In some examples, fiber optic cable 112 may follow a powerline conductor 101 associated with a particular phase of the power being transmitted, or may alternate between two or three different phases, such as at phase-to-ground transitions 114 at utility poles 102. As described in greater detail below, each fiber optic cable 112 may carry one or more optical fibers for facilitating communication within operating environment 100.

Additionally, FIG. 1 illustrates an optical fiber splice case 108 that, in some embodiments, splices together corresponding ends of optical fibers of fiber optic cable 112. For example, relatively long stretches (e.g., multiple-kilometer spans) of fiber optic cable 112 that may be coupled to powerline conductor 101 may be mechanically coupled together, thermally fused together, or otherwise coupled in optical fiber splice case 108, which may include optical couplers, amplifiers, and/or other components to facilitate transmission of optical data signals from one span of fiber optic cable 112 to the next. In some examples, such as that shown in FIG. 1, optical fiber splice case 108 may be attached to, or positioned on, a utility pole 102. In some examples, such as that depicted in FIG. 1, optical fiber splice case 108 may be mounted on a lower portion of utility pole 102 (e.g., in a lower-voltage section at a safe distance away from higher-voltage powerline conductor 101 to facilitate installation of optical fiber splice case 108). Additionally, in some embodiments, a phase-to-ground transition 114 may be coupled with each length of fiber optic cable 112 to be interconnected to provide electrical isolation from powerline conductor 101. However, other locations for optical fiber splice case 108 may also be possible.

FIG. 2 is a block diagram of an exemplary fiber installation system 200 for installing fiber optic cable (e.g., fiber optic cable 112) using preexisting electrical power infrastructure, such as a powerline conductor (e.g., powerline conductor 101). In other examples, other electrical power infrastructure (e.g., messenger lines or other types of cables) may be employed in lieu of powerline conductor 101 upon which fiber optic cable 112 may be installed using the various embodiments described herein.

As depicted in FIG. 2, system 200 may include a motion subsystem 202, a spool subsystem 204, a sensor subsystem 206, a processor 208, and/or one or more batteries 210. In other embodiments, greater or fewer numbers of components or subsystems may be included in system 200. For examples, some embodiments may not include sensor subsystem 206 and/or may include multiple batteries 210. In other embodiments, motion subsystem 202 may be self-powered or be configured to be powered by an external electrical or mechanical device. Other variations are also possible.

In some examples, motion subsystem 202 may include one or more electrical motors, gears, wheels, capstans, belts, and the like, powered by battery 210 to impart motion on system 200 and/or spool subsystem 204. In some embodiments, that motion may include translational propulsion along powerline conductor 101, such by way of wheels or other components contacting powerline conductor 101 to pull or push system 200 along powerline conductor 101.

Also, in some examples, motion subsystem 202 may impart rotating and/or revolving motion on system 200 and/or spool subsystem 204 about powerline conductor 101 as motion subsystem 202 propels system 200 along powerline conductor 101. For example, motion subsystem 202 may revolve spool subsystem 204 and/or the associated spool about powerline conductor 101 while motion subsystem 202 substantially retains its current vertical orientation, thus causing spool subsystem 204 and/or the associated spool to revolve relative to motion subsystem 202. In other examples, motion subsystem 202 may rotate the entire system 200 (e.g., motion subsystem 202, spool subsystem 204, and so on) about powerline conductor 101 substantially as a unit while motion subsystem 202 propels system 200 along powerline conductor 101. Consequently, in such embodiments, this rotation or revolution may cause spool subsystem 204, including a spool carrying a length of fiber optic cable 112, to revolve about powerline conductor 101 as system 200 proceeds along powerline conductor 101 to facilitate helical wrapping of fiber optic cable 112 onto powerline conductor 101. In some examples, the rate at which spool subsystem 204 and/or the associated spool revolves about powerline conductor is related to the rate at which system 200 travels along powerline conductor 101 so that the pitch of fiber optic cable 112 wrapped about powerline conductor 101 remains substantially constant. Maintaining the fiber optic cable 112 wrapping rate in such a manner may be controlled through gearing and/or other mechanical components within motion subsystem 202, by way of process control provided by processor 208, or via other methods.

In addition, in some examples, motion subsystem 202 may cause or control a rotational motion of the spool carrying fiber optic cable 112 as fiber optic cable 112 is wrapped about powerline conductor 101. In some examples, this rotational motion may be controlled to apply a substantially a constant desired level of tension along fiber optic cable 112 as fiber optic cable 112 is wrapped about powerline conductor 101. This tension, in some embodiments, may help prevent both slack in fiber optic cable 112 after installation on powerline conductor 101 and damage to fiber optic cable 112 or the optical fibers carried therein. In some examples, controlling the tension in this manner may be controlled by way of mechanical components that adjust that tension continuously as fiber optic cable 112 is installed, by way of a tension sensor (e.g., a torque transducer) providing information to processor 208 so that processor 208 may adjust the tension by way of a control system, or by other means.

As indicated, spool subsystem 204 may include a spool that carries a length of fiber optic cable 112 for installing on powerline conductor 101. In some examples, the spool may carry 1 kilometer (km) or more of fiber optic cable 112 so that the total number of points at which lengths of fiber optic cable 112 require splicing to span large geographic areas may be reduced accordingly, thus possibly reducing installation time and reducing the optical path loss in fiber optic cable 112. In some embodiments, fiber optic cable 112 is designed with a diameter of less than 4 millimeters (mm) with a fiber strand count of 24 strands and a minimum bend radius of less than ten times the diameter of fiber optic cable 112, thus allowing the diameter of the carrying portion, or "mandrel," of the spool to be twenty times the diameter of fiber optic cable 112. In some examples, fiber optic cable 112 may utilize 200-micron (μm) diameter bare fiber strands.

However, reducing the diameter of the spool mandrel and the diameter of fiber optic cable 112 alone may not be adequate for the spool to carry enough fiber optic cable 112 to achieve a desired span length. To this end, in at least some examples, the spool may define multiple axes of rotation. In other words, instead of the spool appearing substantially as a cylinder with a single axis of rotation, the spool may appear as an elongated tube that exhibits one or more "bends," with or without linear segments or portions therein. Spool designs of this type may facilitate longer, narrower spools that may carry substantially long lengths of fiber optic cable 112 while allowing the spool to be carried relatively close to powerline conductor 101, thus potentially reducing the overall torque applied by the spool to system 200, and thus possibly increasing physical stability, during the installation process.

In other embodiments, the spool may define a noncylindrical shape, as viewed along a rotational axis of the spool. For example, the spool shape may take the form of an oval or "racetrack" shape. Further, in some examples, the oval may be curved about powerline conductor 101 (e.g., at a particular radius from powerline conductor 101) when installed on system 200. In such embodiments, the shape of the spool may be held constant while the surface of the mandrel moves relative to the shape of the spool, potentially without rotating the entire spool about an axis defined by the spool, to facilitate the paying out of fiber optic cable 112. For example, the mandrel may include a belt or other flexible surface that slides or otherwise moves relative to the spool, thereby moving fiber optic cable 112 about the mandrel while keeping the remainder of the spool fixed. In such embodiments, the spool may carry a greater amount of fiber optic cable 112 than a comparable cylindrical spool, as the spool shape may be extended along one axis (e.g., an axis parallel to power conductor 101), thereby increasing the length of fiber optic cable 112 being carried while maintaining a constant clearance distance around powerline conductor 101.

In some embodiments, two fiber installation systems 200 may be employed such that each corresponding spool carries approximately half of a continuous length (e.g., 1 km) of fiber optic cable 112. Consequently, the two systems 200 may travel in opposing directions along powerline conductor 101 while helically wrapping different portions of the same fiber optic cable 112 in the same rotational direction (e.g., clockwise or counterclockwise), resulting in a single length of fiber optic cable 112 being installed on powerline conductor 101 that is longer than either single spool may individually carry.

In some examples, spool subsystem 204 may include a fiber guide that guides fiber optic cable 112 onto powerline conductor 101 during installation. Moreover, in some embodiments, the fiber guide may also help guide fiber optic cable 112 onto the spool during the loading process. In some examples, this loading process may occur while the spool is installed in system 200, or while the spool is separate from system 200. To facilitate the ability to separate spool subsystem 204 from system 200, spool subsystem 204 may further include a coupler (e.g., a mechanical coupler, a magnetic coupler, or the like) that releasably couples the spool to system 200.

In some embodiment, system 200 may also include sensor subsystem 206 that senses a surrounding environment (e.g., operating environment 100 of FIG. 1) of system 200. For example, sensor subsystem 206 may include a LIDAR (light detection and ranging) system, an imaging (e.g., camera-based) system, and/or a rotary encoder to determine the current location and overall progress of system 200 when travelling along powerline conductor 101. Additionally or alternatively, in some embodiments, sensor subsystem 206 may include a locating subsystem (e.g., a Global Positioning System (GPS)-based subsystem) that may report and/or record a current location of system 200 (e.g., a location along the conductor, or a location at which the robotic device was attached to the conductor (e.g., at a utility pole)) for mapping out fiber optic cable 112 within a communication system, or for mapping out powerline conductor 101 as part of the electrical power grid. In some examples, a build plan for fiber optic cable 112, which may include determinations as to where fiber splices (e.g., at associated optical fiber splice cases 108) of consecutive lengths of fiber optic cable 112 may be located (e.g., aligned with the locations of double dead-ends or other points of the power grid that includes powerline conductor 101), may be formulated or modified based on data from the locating subsystem. In some examples, sensor subsystem 206 may also include sensors associated with motion subsystem 202 (e.g., motion sensors, translational speed sensors, rotational speed sensors, and so on) and/or spool subsystem 204 (e.g., tension sensor for fiber optic cable 112 when installing fiber optic cable 112 about powerline conductor 101) to facilitate substantially consistent wrapping (e.g., in terms of helically wrap rate and tension) of fiber optic cable 112.

Processor 208, in some embodiments, may control the operation of motion subsystem 202 (e.g., as described above) and/or other subsystems or components of system 200. In some examples, processor 208 may provide completely autonomous operation of system 200 for at least some periods of time, or may facilitate remotely controlled operation of system 200, such as by way of a human onsite or offsite operator. In some examples, processor 208 may be communicatively coupled (e.g., wirelessly or via a wired tether) to a remote control device held by a human operator to issue supervisory control commands to motion subsystem 202. Also, in some embodiments, processor 208 may collect accelerometer data (e.g., from sensor subsystem 206), which may be used to detect sudden movement indicative of a loss of physical balance or attachment to powerline conductor 101. In such embodiments, processor 208 may issue a command to an actuator of motion subsystem 202 to release a clamp that grasps or otherwise engages powerline conductor 101 to prevent system 200 from falling from powerline conductor 101. Processor 208 may also perform other operations (e.g., engage in remote communication with a computer system, control and communicate with sensor subsystem 206, and so on) associated with system 200. In some examples, processor 208 may include hardware control logic and/or a processor (e.g., microprocessor, microcontroller, or the like) that executes software or firmware instructions stored in a memory subsystem (not shown in FIG. 2).

As depicted in FIG. 2, system 200 may also include one or more batteries 210 (e.g., rechargeable batteries) to provide electrical power to motion subsystem 202, sensor subsystem 206, processor 208, and the like. In some examples, batteries 210 may be placed or distributed about system 200 to enhance the mechanical stability of system 200 during travel along powerline conductor 101 and the concurrent wrapping of fiber optic cable 112 around powerline conductor 101.

Figure 3A:
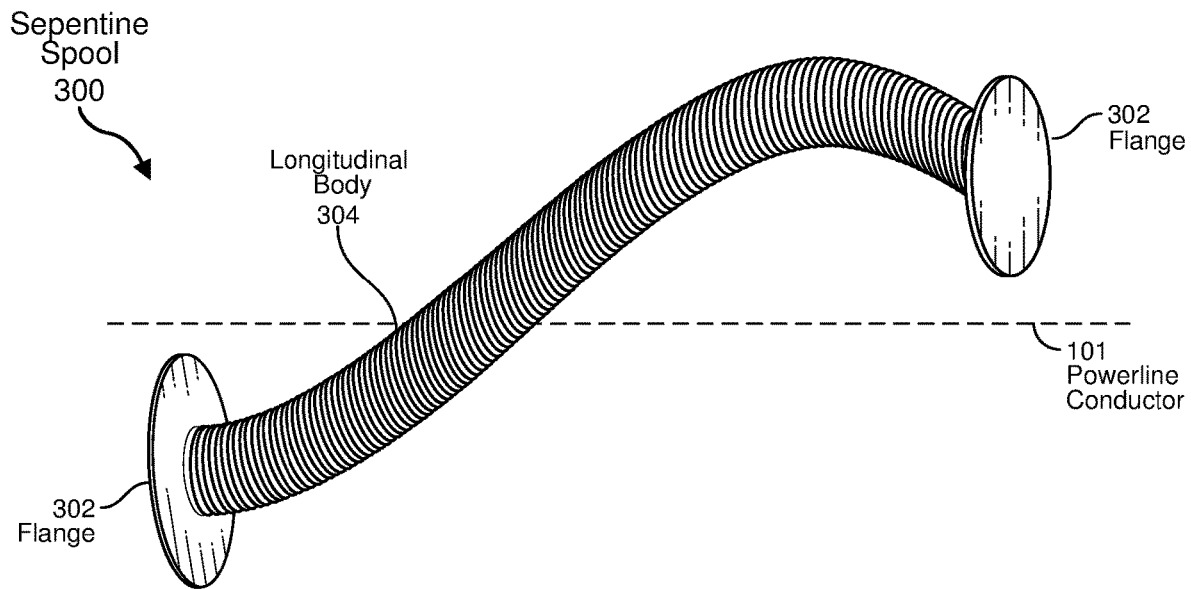
FIGS. 3A, 3B, and 3C are different views of an exemplary serpentine spool for carrying a length of fiber optic cable for installation.
Figure 3B:
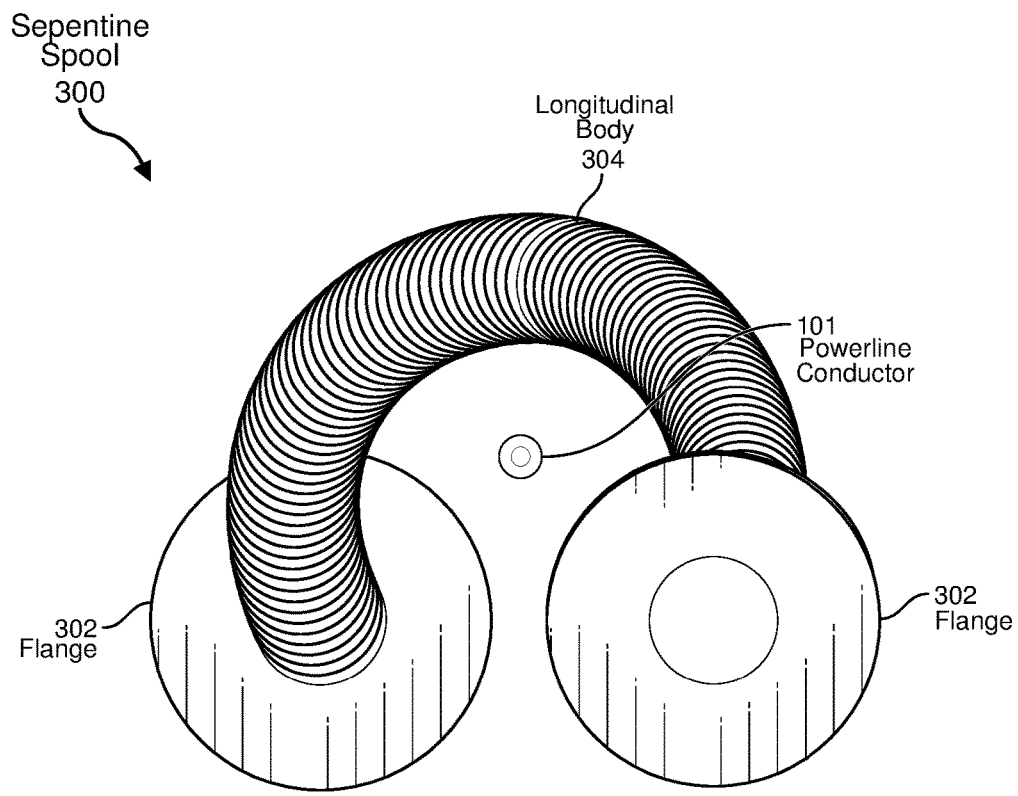
Figure 3C:
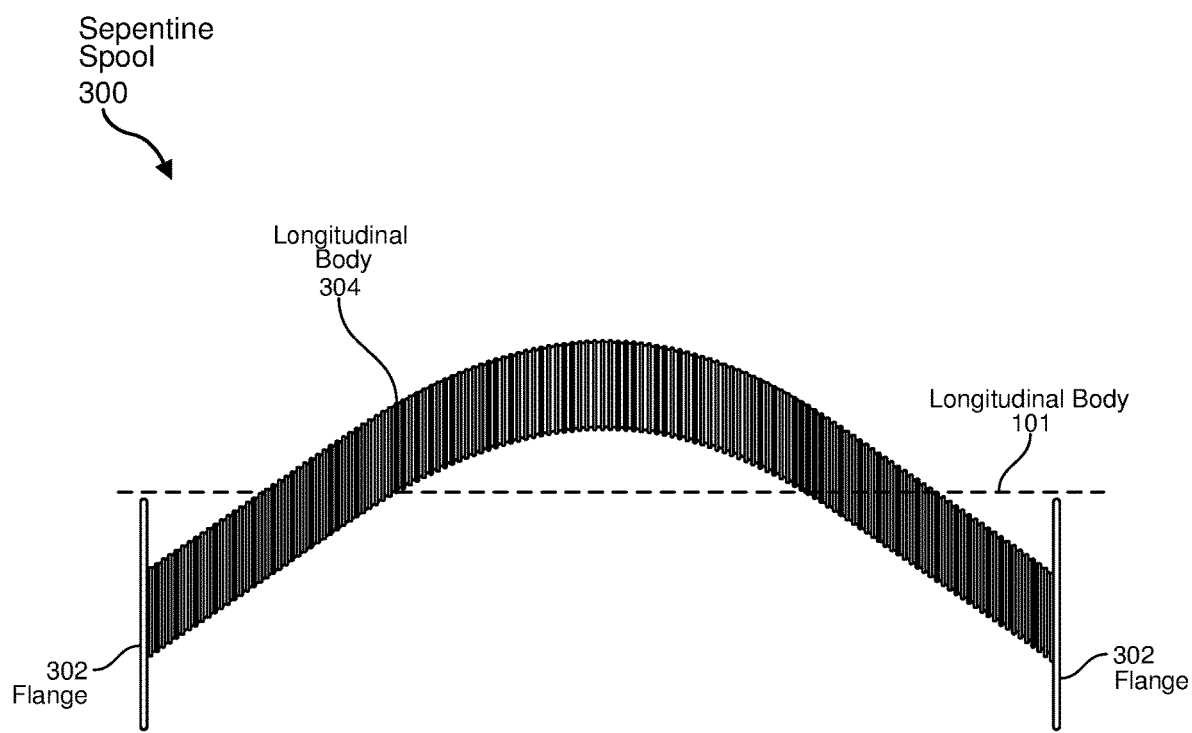

FIGS. 3A-3C are different views (e.g., a top view, an end view, and a side view, respectively) of an exemplary serpentine spool 300 for carrying a length of fiber optic cable 112 for installation on powerline conductor 101 or similar structure. As shown in FIGS. 3A-3C, serpentine spool 300 may include a longitudinal body 304 about which a length of fiber optic cable 112 may be wrapped, coupled at each end to a corresponding flange 302 that may facilitate retention of fiber optic cable 112 on serpentine spool 300. In some examples, serpentine spool 300 (e.g., by way of longitudinal body 304) may appear to exhibit somewhat of a corkscrew or helical shape. In some examples, serpentine spool 300 describes a helical curve that, when carried by motion subsystem 202, may simultaneously extend along powerline conductor 101 while circling about powerline conductor 101 within a particular range of radii perpendicular to powerline conductor 101. Consequently, serpentine spool 300 may define, in some examples, a continuously changing rotational axis when proceeding from one end of serpentine spool 300 to the other. In other examples, serpentine spool 300 may define a plurality of discreet rotational axes that are substantially parallel to each other, depending on the physical construction of serpentine spool 300. In some embodiments, use of serpentine spool 300 may allow the center of mass of serpentine spool 300 to reside near or at the center of powerline conductor 101.

In some embodiments, longitudinal body 304 of serpentine spool 300 may include a series of discs that are coupled together and that may rotate to at least some degree relative to each other. Examples of such embodiments are described below in conjunction with FIGS. 4A-4C, 5A-5C, 6A-6C, and 7A-7B. In some examples, to provide the helical shape of serpentine spool 300, the rotational axis of each disc may be offset by a set amount from that of a preceding disc to provide a consistent curvature for longitudinal body 304. In other examples, longitudinal body 304 may include other types of components, such as short cylinders, intercoupled in some fashion. In yet other embodiments, longitudinal body 304 may include some type of flexible structure. Other embodiments are also possible.

Also, in some examples, the discs or other components may be employed as an internal structure over which an external structure or material may be placed to form a surface upon which fiber optic cable 112 may be wrapped for storage on serpentine spool 300. Using discs as an example, a tube potentially made of a mesh material may cover the discs, which in this case may freely rotate relative to each other. In some examples, flanges 302 may be connected to the mesh material, and may include features to allow an electrical motor to rotate the mesh surface, thereby rotating the discs. In some embodiments, the freely rotating discs may contain a cylindrical component around which a bearing is placed. The cylindrical component may have features which allow each cylindrical component to be connected to an adjacent cylindrical component at a fixed offset of centers with a controlled angle and relative position to set the angular change per unit length of serpentine spool 300, which may result in a consistent curvature for longitudinal body 304, as indicated above.

In other examples, such as those described below, a disc at one end of longitudinal body 304 may be driven by an electrical motor instead of an external structure or material lying over the discs. In turn, that disc may be coupled in such a manner to the other discs in series that the other discs are rotated as well. In such embodiments, several types of external structures may be placed atop the discs along longitudinal body 304. For example, a flexible fabric or mesh material, such as that mentioned above, may be placed over the discs to provide a "skin-like" surface over which fiber optic cable 112 may be wrapped.

In other embodiments, a surface to cover the discs may be quantized (e.g., composed of multiple individual components), as opposed to continuous, in structure. For example, the surface may be created using parallel tubes, wires, or the like. In some embodiments, these components may be aligned (e.g., side by side) against a periphery of the discs along longitudinal body 304, from one flange 302 to another. Also, in some examples, the number of components may be sufficient so that fiber optic cable 112, when wrapped onto longitudinal body 304, including the quantized surface, describes a curve having a radius greater than the minimum recommended bend radius for fiber optic cable 112.

In yet other examples, a surface to cover the discs may include a helical spring (e.g., a pre-compressed helically-wound spring). In some embodiments, a quantized set of components (e.g., wires, elastic lines, or the like, as described above) may be laid across the discs first (e.g., to maintain a particular orientation of the discs relative to each other), followed by application of the helical spring over longitudinal body 304, which may provide a relatively smooth surface over which to wrap fiber optic cable 112 prior to installation on powerline conductor 101.

In some embodiments, at least one flange 302 may include inner and outer flange portions. In some examples, the inner flange portion may range from the center of flange 302 to a particular radius from the center, and the outer flange portion may range from the particular radius to the edge of flange 302. The inner flange portion may be coupled to the discs of longitudinal body 304 by way of one of the spool rotational drive mechanisms mentioned above, and as described in greater detail below. The outer flange portion, in some examples, may be attached to a frame or another portion (e.g., a spine or central portion) of system 200. Consequently, in some cases, other components of system 200

(e.g., electrical motors of motion subsystem 202, battery 210, and so on) may be mounted to the outer flange portion (e.g., to help balance system 200).

Spool subsystem 204, in some embodiments, may also include a guide mechanism that may be employed to load and/or unload the length of fiber optic cable 112 to and/or from serpentine spool 300. For example, the guide mechanism may facilitate efficient loading or packing of fiber optic cable 112 onto serpentine spool 300 to maximize the length of fiber optic cable 112 that may be loaded onto serpentine spool 300. In addition, in some embodiments, guide mechanism may guide fiber optic cable 112 from serpentine spool 300 onto powerline conductor 101 in such a manner that possible contact or interference of fiber optic cable 112 with other portions of system 200 may be minimized. In one embodiment, the guide mechanism may include a helically-shaped guide that is coaxial with longitudinal body 304 that maintains a fixed distance from a surface of fiber optic cable 112 while residing on serpentine spool 300 as fiber optic cable 112 is loaded or unloaded from serpentine spool 300. In some examples, the guide mechanism may be configured to change the direction of fiber optic cable 112 as flange 302 is encountered during loading or unloading. Further, in some embodiments, the guide mechanism may be configured to ensure that bending of fiber optic cable 112 during loading or unloading does not fall below a minimum recommended bend radius for which fiber optic cable 112 is rated. To that end, examples of the guide mechanism may include a wheel of sufficient radius that exceeds the minimum bend radius so that fiber optic cable 112 may be pass over the wheel safely. In other embodiments, the guide mechanism may include a tube of a low friction material with an inner diameter that is greater than an outer diameter of fiber optic cable 112 so that fiber optic cable 112 may pass through the tube as the tube directs fiber optic cable 112 to or from serpentine spool 300 along a curved path formed with a path bend radius greater than the allowed bend radius of fiber optic cable 112. In some embodiments, multiple curved sections of the tube may be connected through a rotation or swivel joint that allows one curved section to twist relative to another such that a portion of fiber optic cable 112 entering the tube is directed in a different orientation from another portion of fiber optic cable 112 leaving the tube while maintaining the minimum bend radius of fiber optic cable 112.

In some embodiments, the guide mechanism may also include a transducer that measures the tension of fiber optic cable 112 as fiber optic cable 112 leaves serpentine spool 300. The measurement may be provided to processor 208, in some examples, so that processor 208 may adjust the rotational speed of serpentine spool 300 such that fiber optic cable 112 is wrapped about powerline conductor 101 at a substantially constant tension, as mentioned above.

Four different, more specific embodiments of serpentine spool 300 are illustrated in FIGS. 4A-4C, FIGS. 5A-5C, FIGS. 6A-6C, and FIGS. 7A and 7B, respectively. Each of these embodiments involves a drive system in which a plurality of discs 406 are coupled to each other to form longitudinal body 304. This series of discs 406 may also be coupled at each end to a flange 402. In each of these embodiments, discs 406 may be coupled together such that one flange 402 (or an inner portion of flange 402, as mentioned above) may be rotated by way of an electrical motor, thus causing rotation of all discs 406, thus possibly rotating longitudinal body 304 as a unit independently of the helical revolution of serpentine spool 300.

Figure 4A:
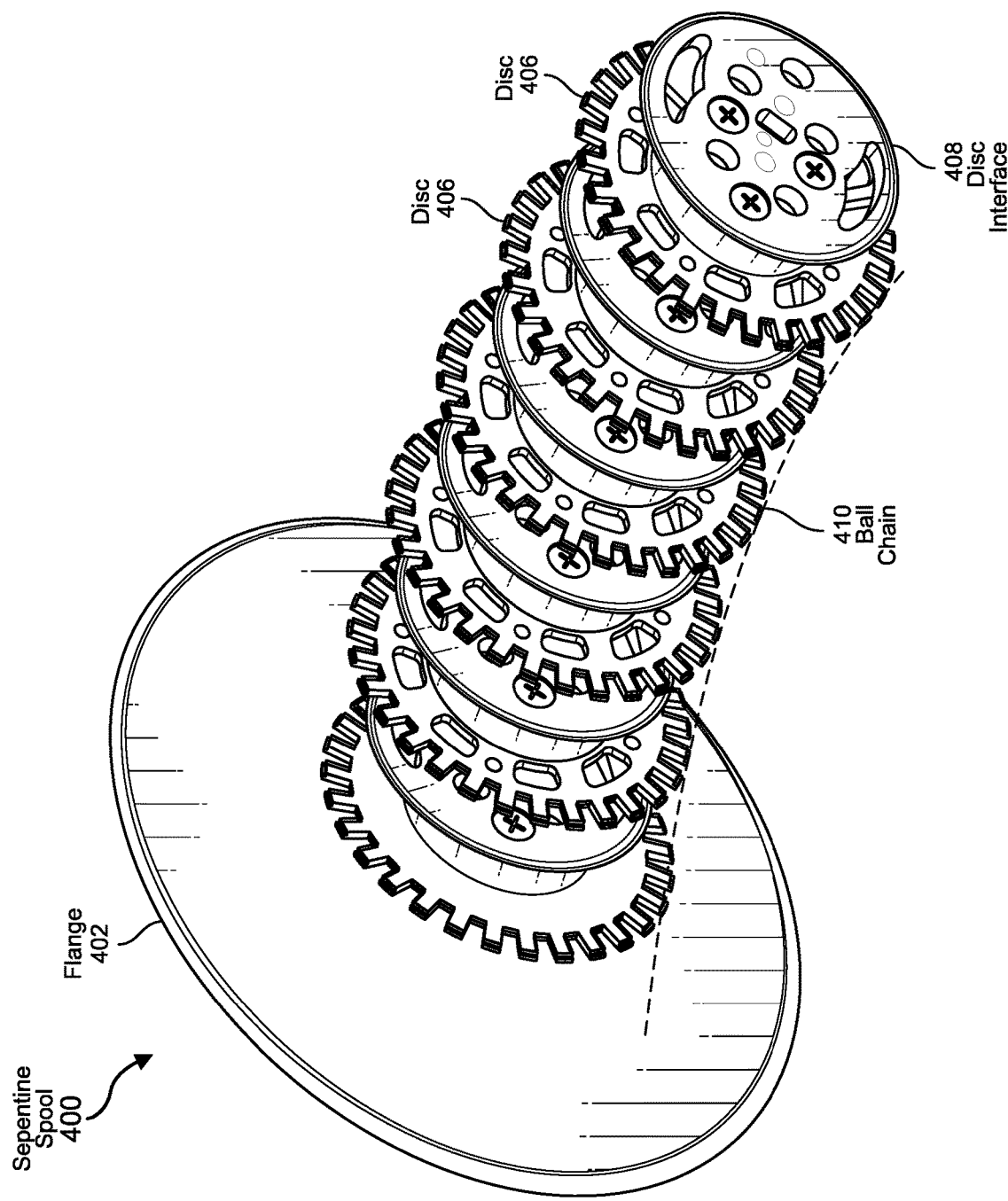
FIGS. 4A, 4B, and 4C are different views of an exemplary serpentine spool that employs multiple discs intercoupled using one or more ball chains or wires.
Figure 4B:
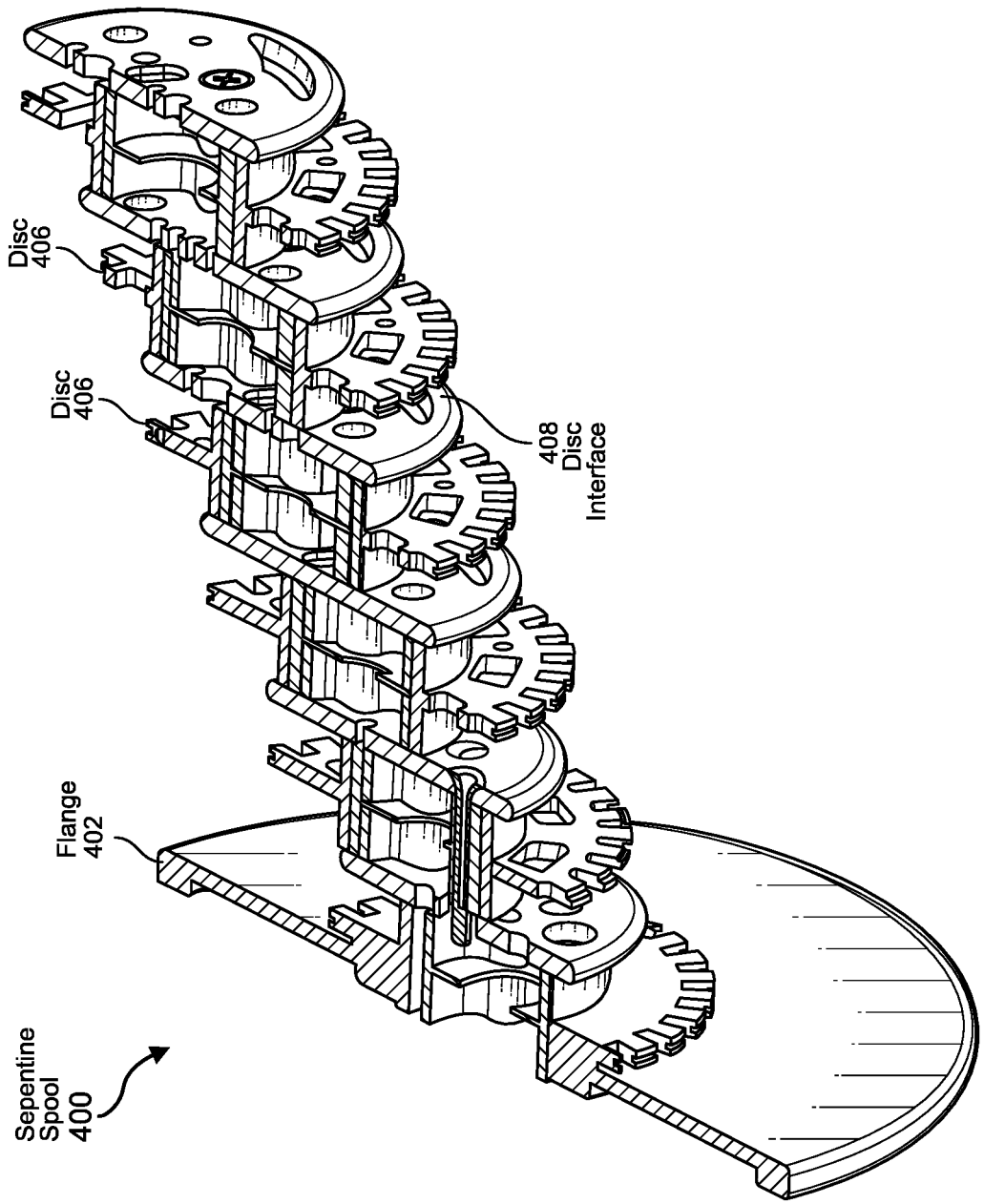
Figure 4C:
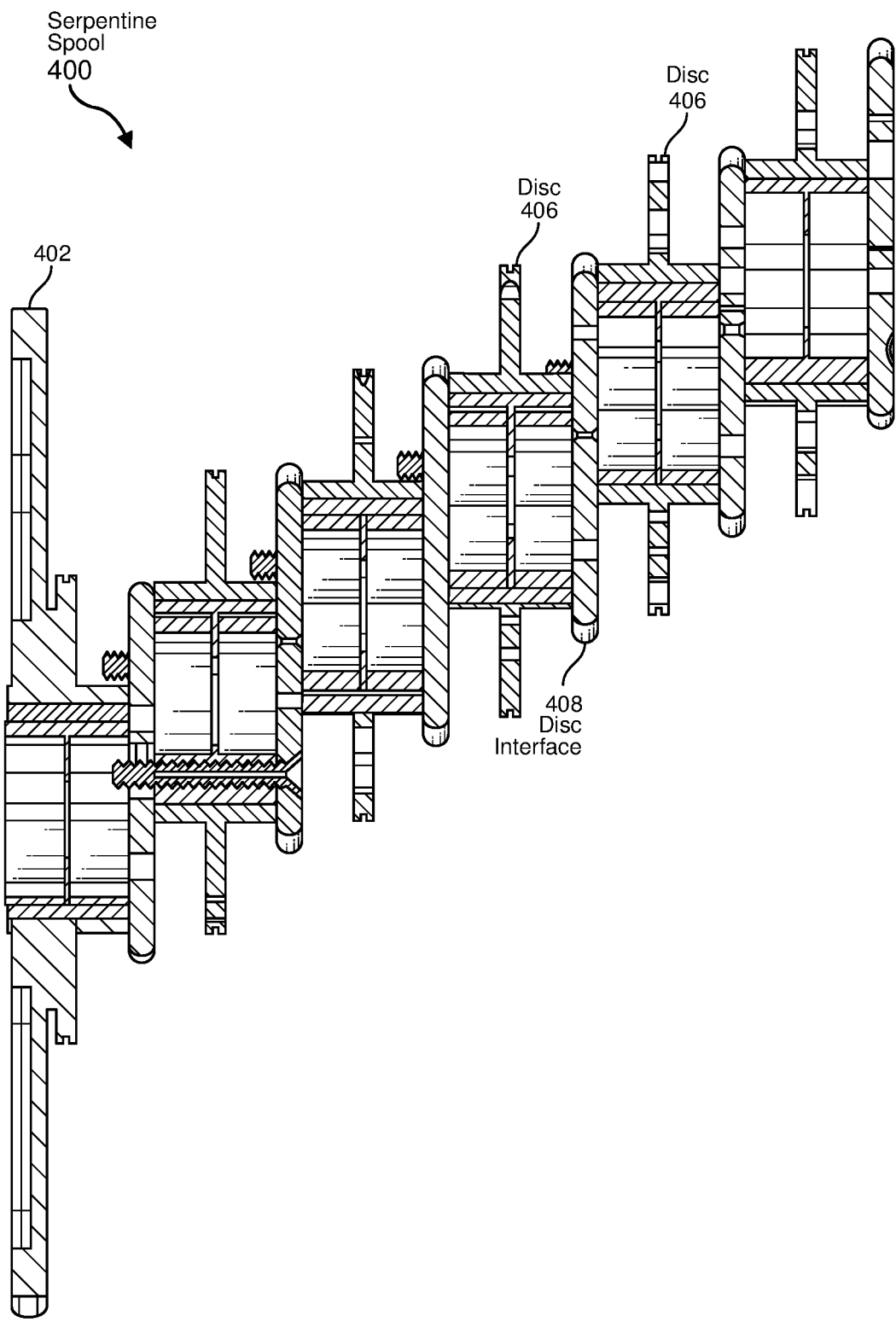

FIGS. 4A-4C are varying views of an exemplary serpentine spool 400 employing a chain or wire drive design that includes a plurality of discs 406 that are joined at their periphery to either or both flanges 402 by parallel ball chains 410, wires, or other longitudinal components such that rotating one flange 402 causes discs 406 to rotate at the same rate. As shown in FIGS. 4A and 4B, the periphery of each disc 406 may include notches of other features to facilitate coupling with ball chains 410, wires, or the like. In examples in which ball chains 410 are employed, a somewhat constant distance between discs 406 at their periphery may be maintained, while the user of wires may allow some dynamic adjustment in distances between discs 406.

In some embodiments, each disc 406 may be coupled to an adjacent disc 406 by way of a disc interface 408. In some embodiments, each disc 406 may include a cylindrical hub at its center that may rotate independently of the periphery of disc 406, such as by way of a bearing. Moreover, in some embodiments, each disc interface 408 may be coupled on opposing sides to two consecutive discs 406 at their cylindrical hub such that the center of each disc 406 is aligned off-center from the center of disc interface 408. In some examples, the consecutive discs 406 are aligned with intervening disc interface 408 such that the entire serpentine spool 400 defines a helical curve. To provide that curve, in some examples, the centers of consecutive discs 406 may be aligned opposite from, but not diametrically opposed to, each other from the center of corresponding disc interface 406. Moreover, in some embodiments, the cylindrical hub of each disc 406 may be coupled to two corresponding disc interfaces 408 such that the centers of those disc interfaces 408 may be aligned opposite from, but not diametrically opposed to, each other from the center of intervening disc 406.

Figure 5A:
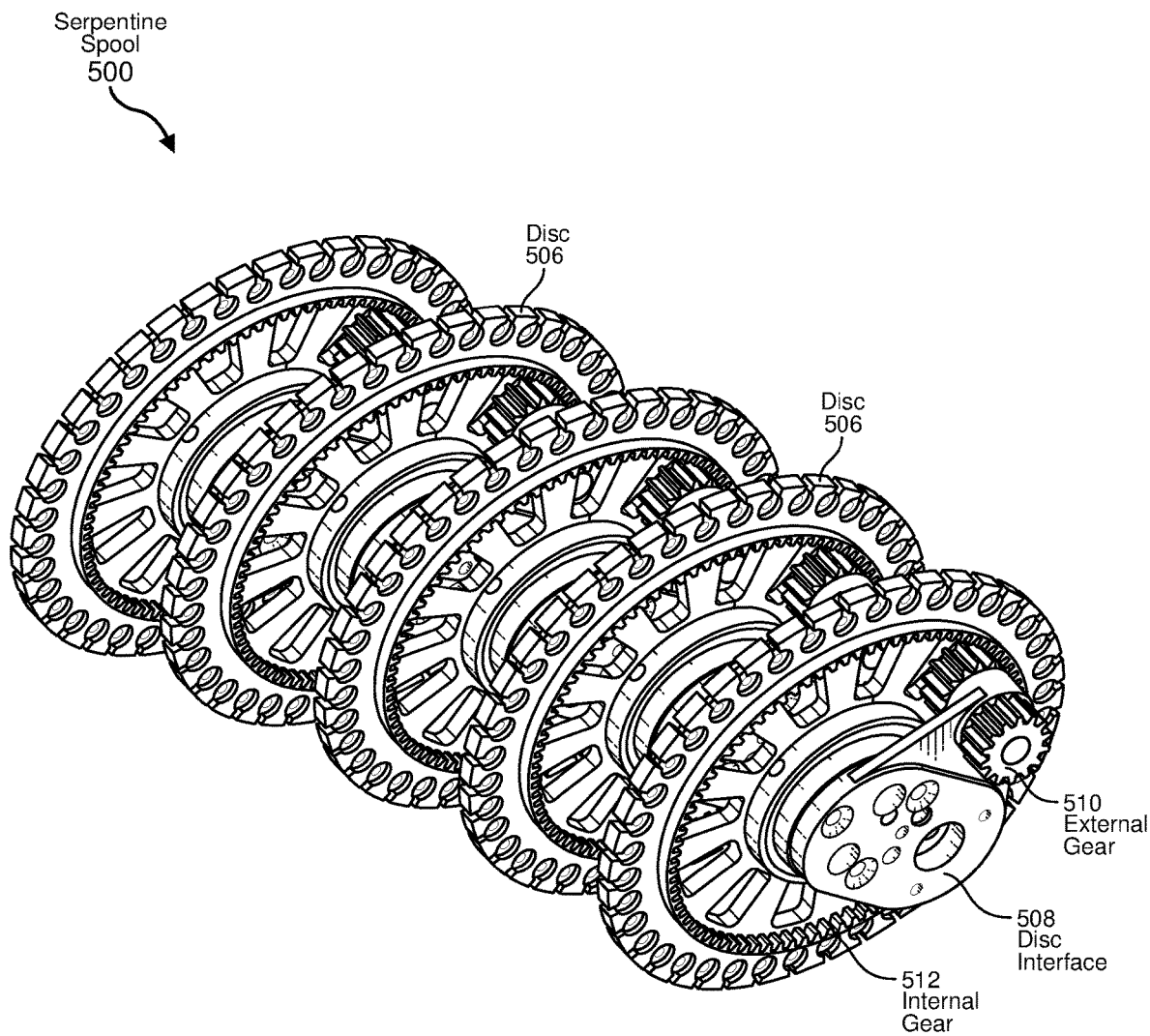
FIGS. 5A, 5B, and 5C are different views of an exemplary serpentine spool that employs multiple discs intercoupled using multiple gears.
Figure 5B:
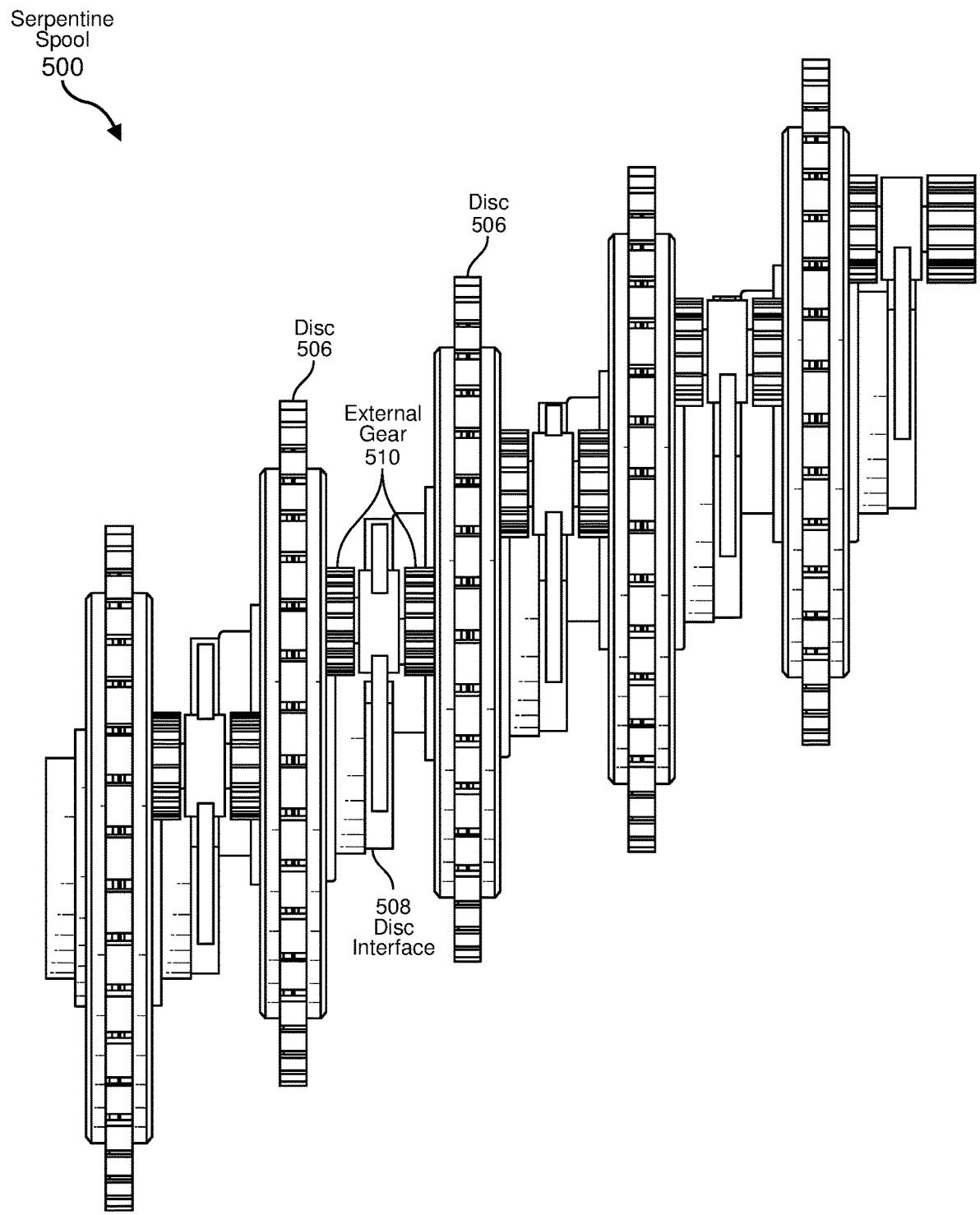
Figure 5C:
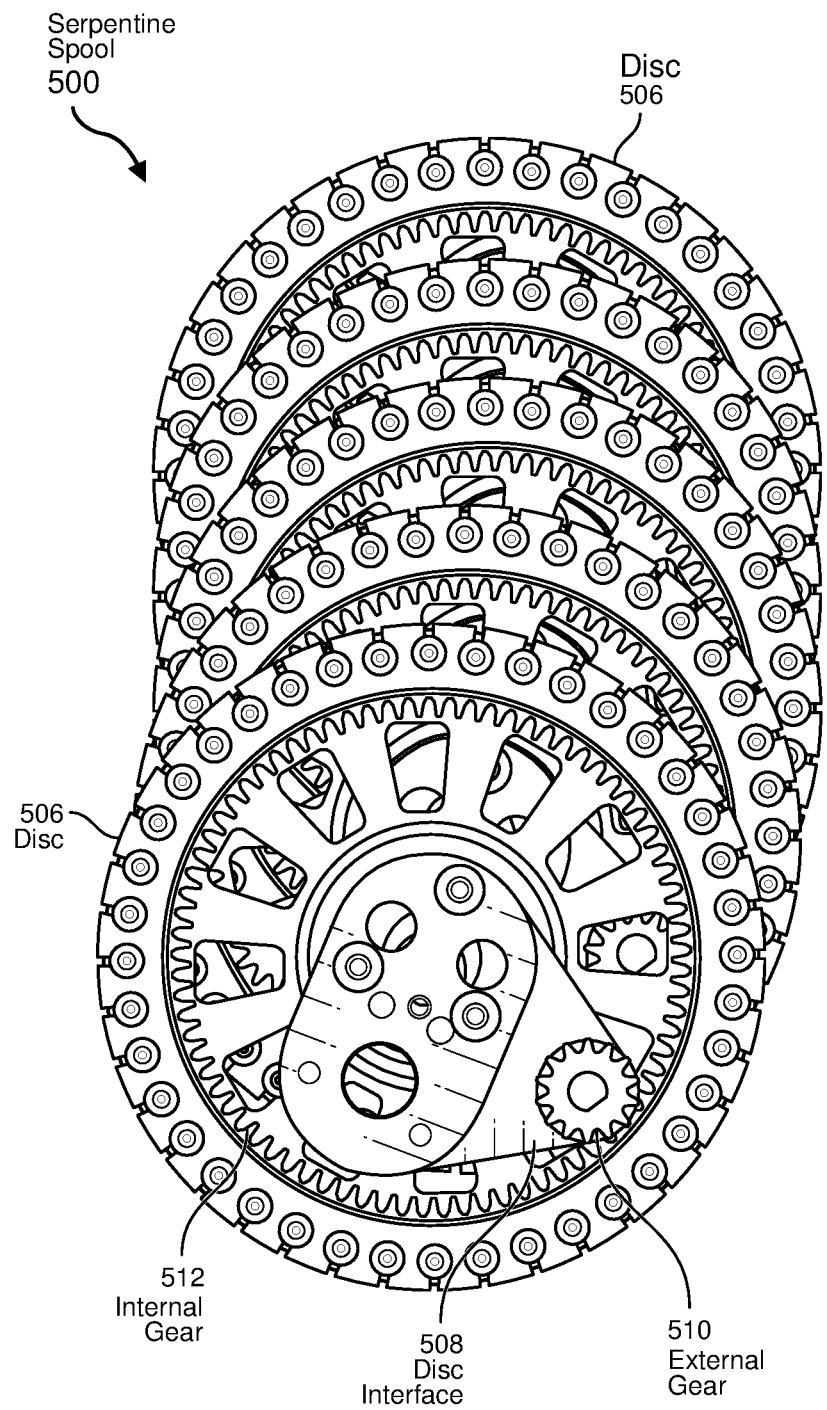

FIGS. 5A-5C are varying views of an exemplary serpentine spool 500 employing a gear drive design in which each of a plurality of discs 506 may define an annular or internal gear 512 on opposing faces. Each disc 506 may also rotate independent about a cylindrical hub. In addition, each pair of discs 506 may be coupled together via an intervening disc interface 508 providing opposing pinion or external gears 510 that engage with the adjacent discs 506. Further, in some examples, external gears 510 of each disc interface 508 may be mounted on an axle held by an arm extending from a mounting portion of disc interface 508. In some embodiments, each disc interface 508 may be affixed to the cylindrical hub of consecutive discs 506 at different areas of the mounting portion of disc interface such that the centers of consecutive discs 506 are offset so that the plurality of discs 506 describe a helical curve, as described above.

The periphery of discs 506 may be covered, in some embodiments, by a flexible mesh or other material upon which fiber optic cable 112 may be loaded. In operation, rotating a disc 506 at one end of serpentine spool 500 may cause remaining discs 506 to rotate in a corresponding manner via intervening internal gears 512 and external gears 510. Consequently, serpentine spool 500 may rotate independently of its revolving about powerline conductor 101 during the installation of fiber optic cable 112.

Figure 6A:
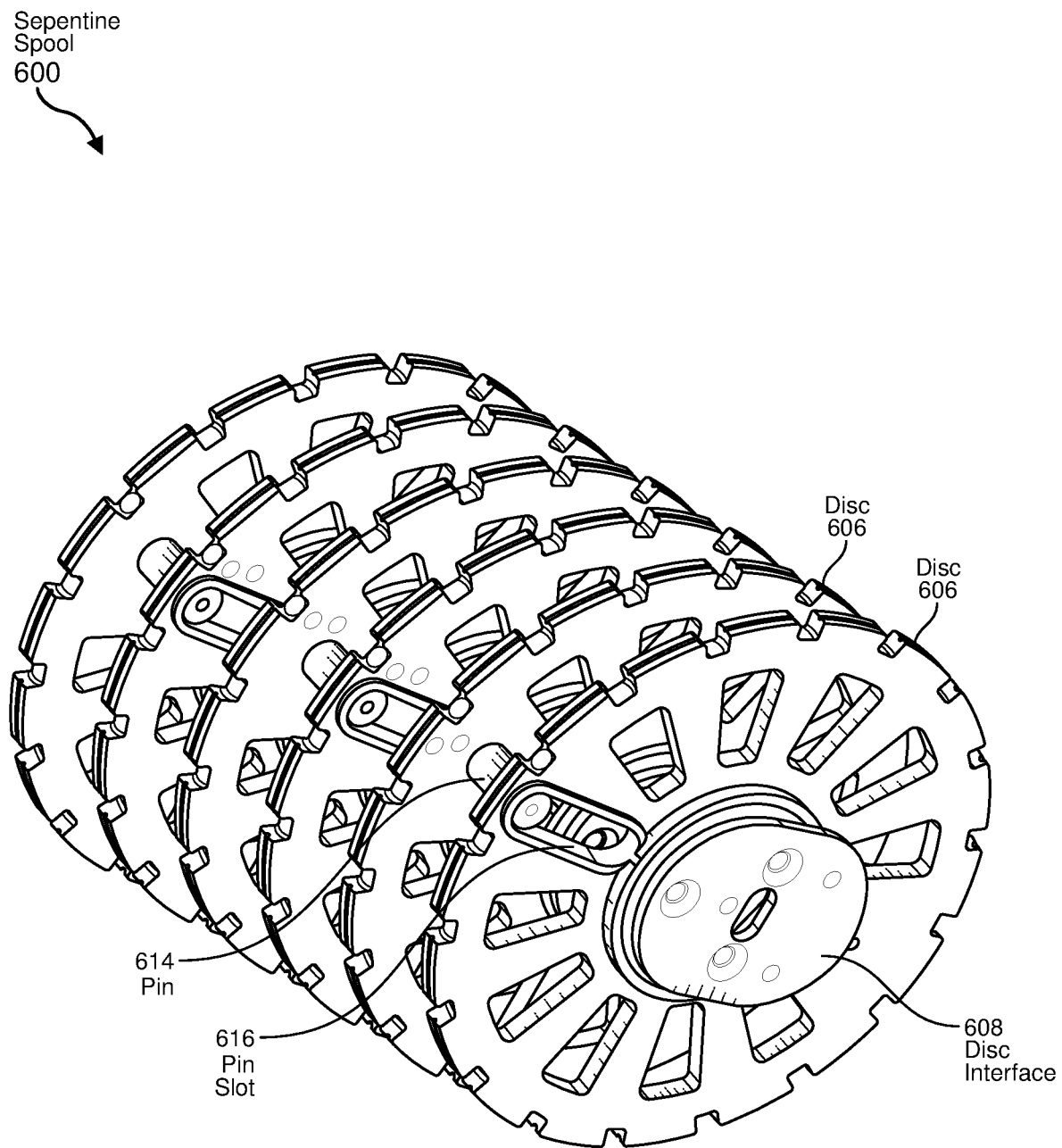
FIGS. 6A, 6B, and 6C are different views of an exemplary serpentine spool that employs multiple discs intercoupled using multiple fixed pins and corresponding slots.
Figure 6B:
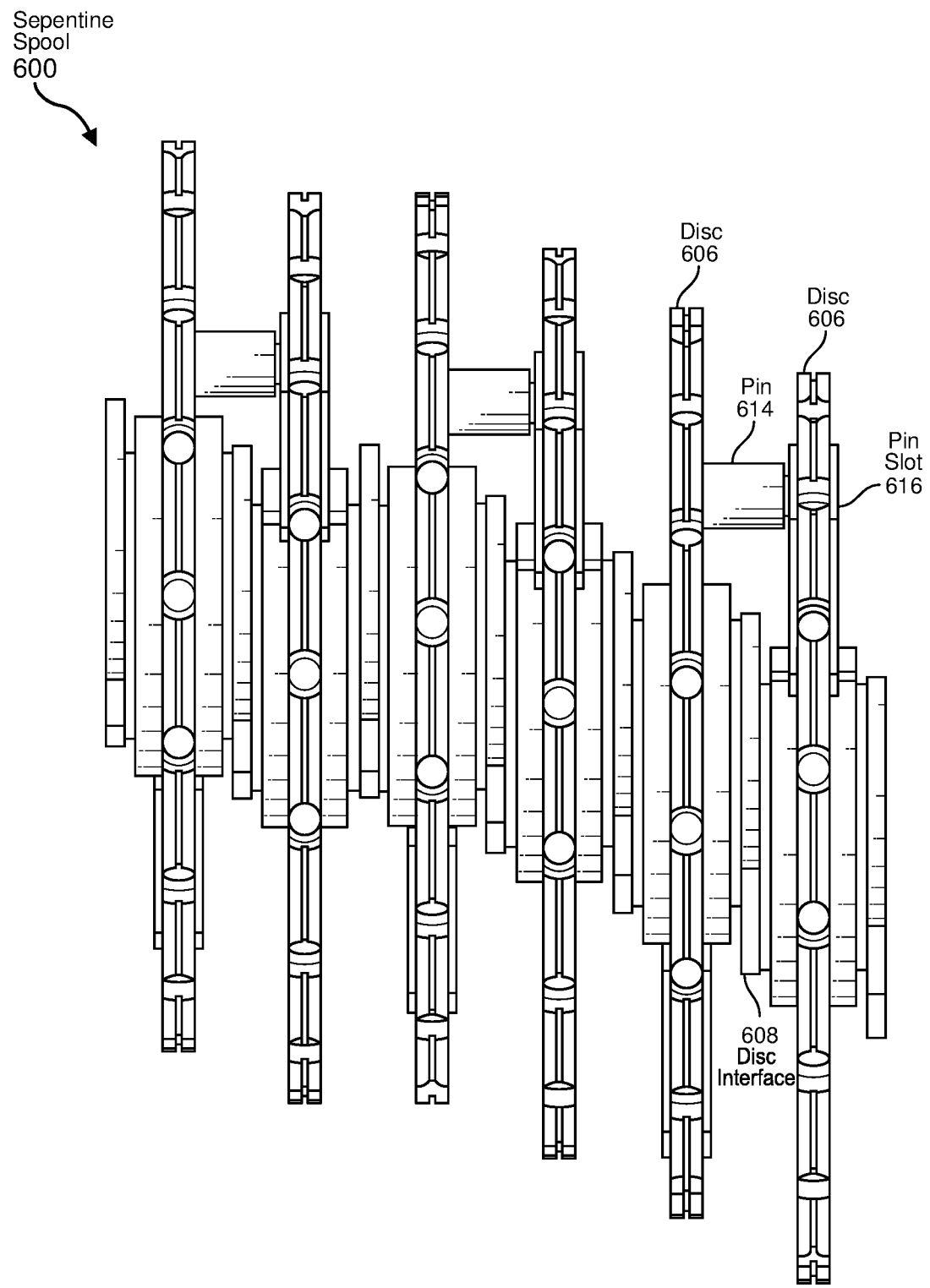
Figure 6C:
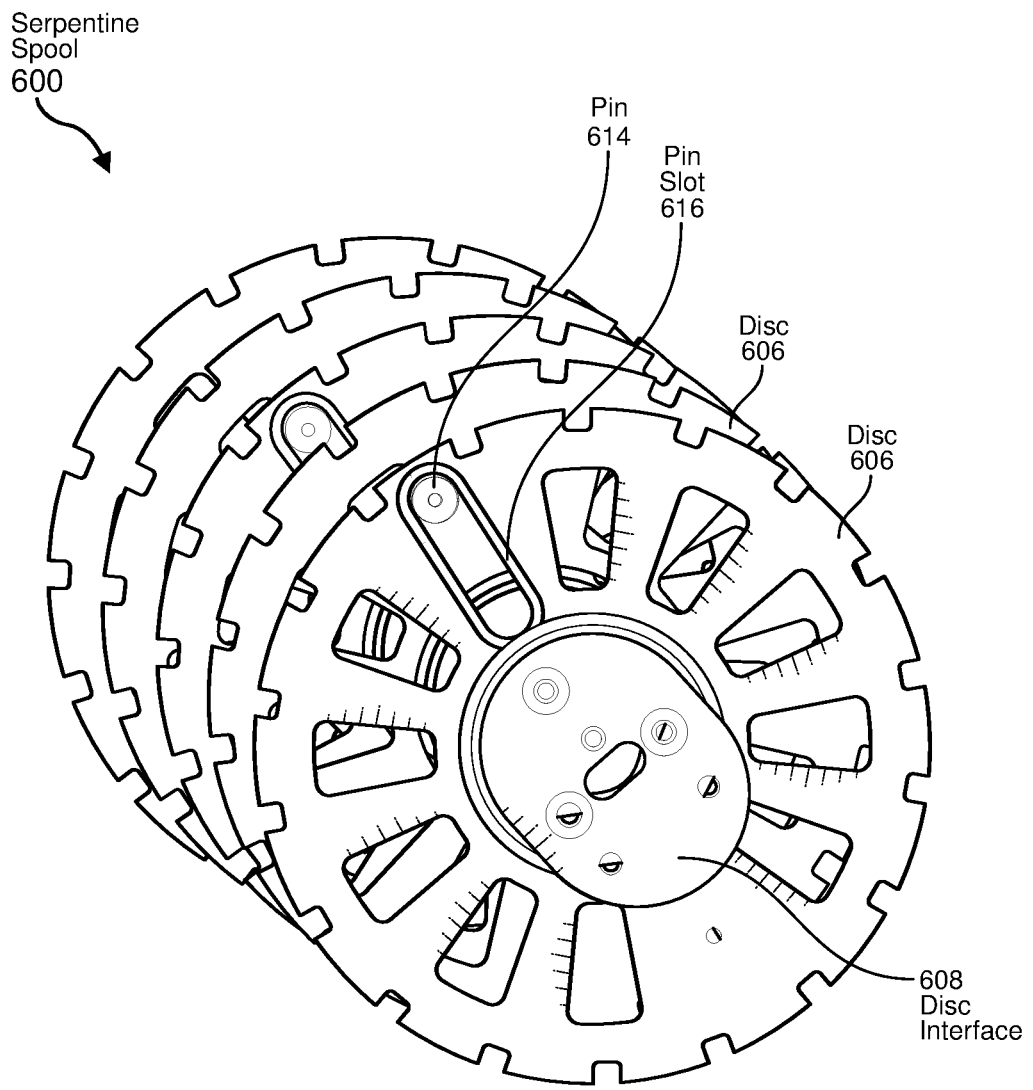

FIGS. 6A-6C are varying views of an exemplary serpentine spool 600 employing a fixed pin drive design in which a plurality of discs 606 are coupled by intervening disc interfaces 608. Once again, each disc 606 may include a cylindrical hub about which disc 606 may rotate, such as by way of a bearing. Also, as before, each disc 606 may be offset from a center of disc interface 608 such that the centers of discs 606 describe a helical curve. Additionally, each disc 606 may have a pin 614 fixably attached to a side of disc 606 such that pin 614 extends perpendicularly toward the next disc 606. An end of pin 614 may then extend into a pin slot 616 of the next disc 606 to couple the adjacent discs 606 together. In some embodiments, pin 614 may include a rotational mechanism (e.g., a wheel) received at pin slot 616 such that the rotational mechanism may roll against an edge of pin slot 616 to minimize friction therebetween. Moreover, pin slot 616 may be oriented radially from the center of disc 606 defining that pin slot 616.

The periphery of discs 606, in some examples, may be covered by a flexible mesh or other material upon which fiber optic cable 112 may be loaded. In operation, rotating a disc 606 at one end of serpentine spool 600 may cause remaining discs 606 to rotate in a corresponding manner via pins 614 and corresponding pin slots 616. As discs 606 rotate, each pin 614 may proceed along corresponding pin slot 616 to accommodate the offset arrangement of discs 606. Consequently, serpentine spool 600, as with other embodiments described above, may rotate independently of its revolving about powerline conductor 101 during the installation of fiber optic cable 112.

Figure 7A:
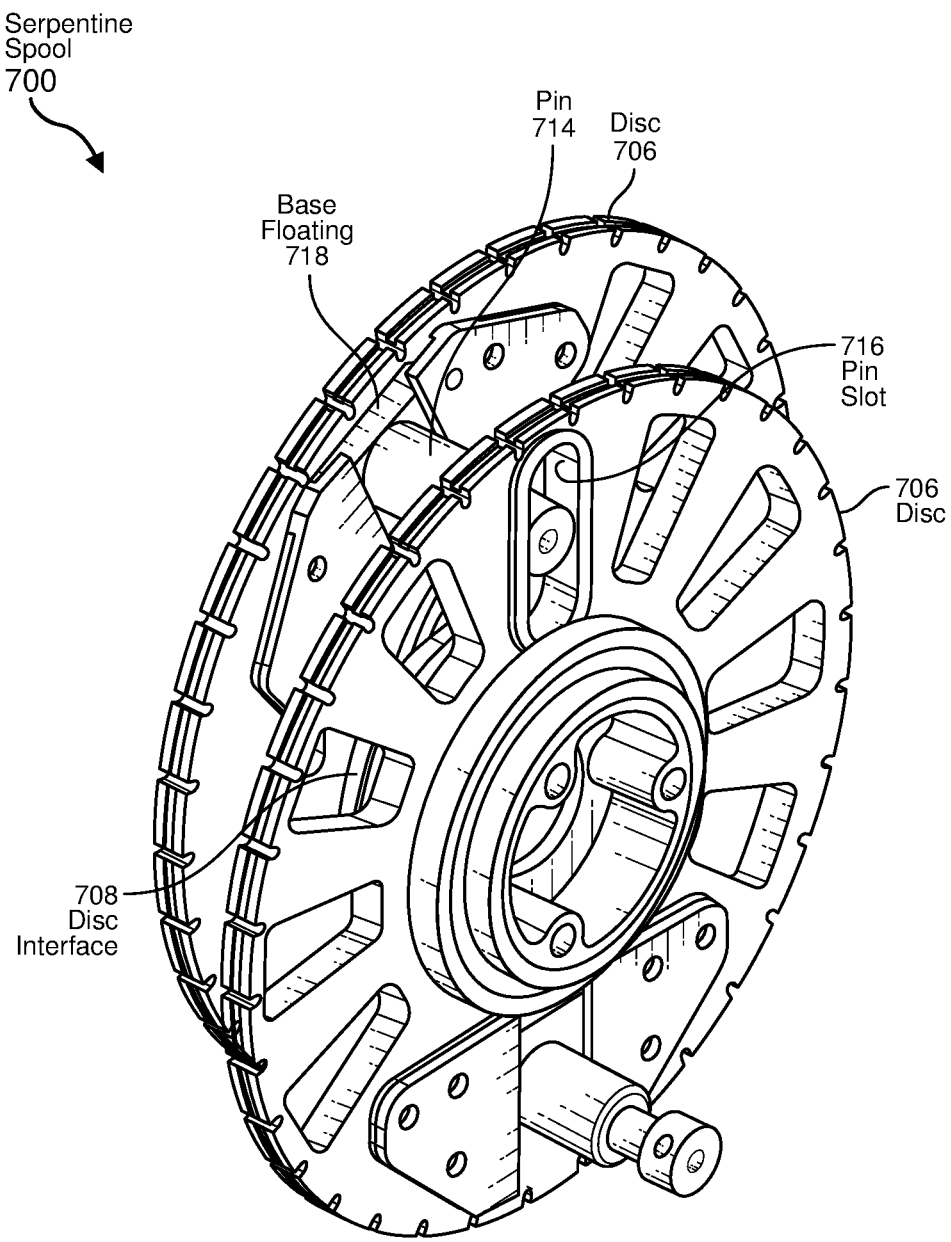
FIGS. 7A and 7B are different views of an exemplary serpentine spool that employs multiple discs intercoupled using multiple floating pins and corresponding slots.
Figure 7B:
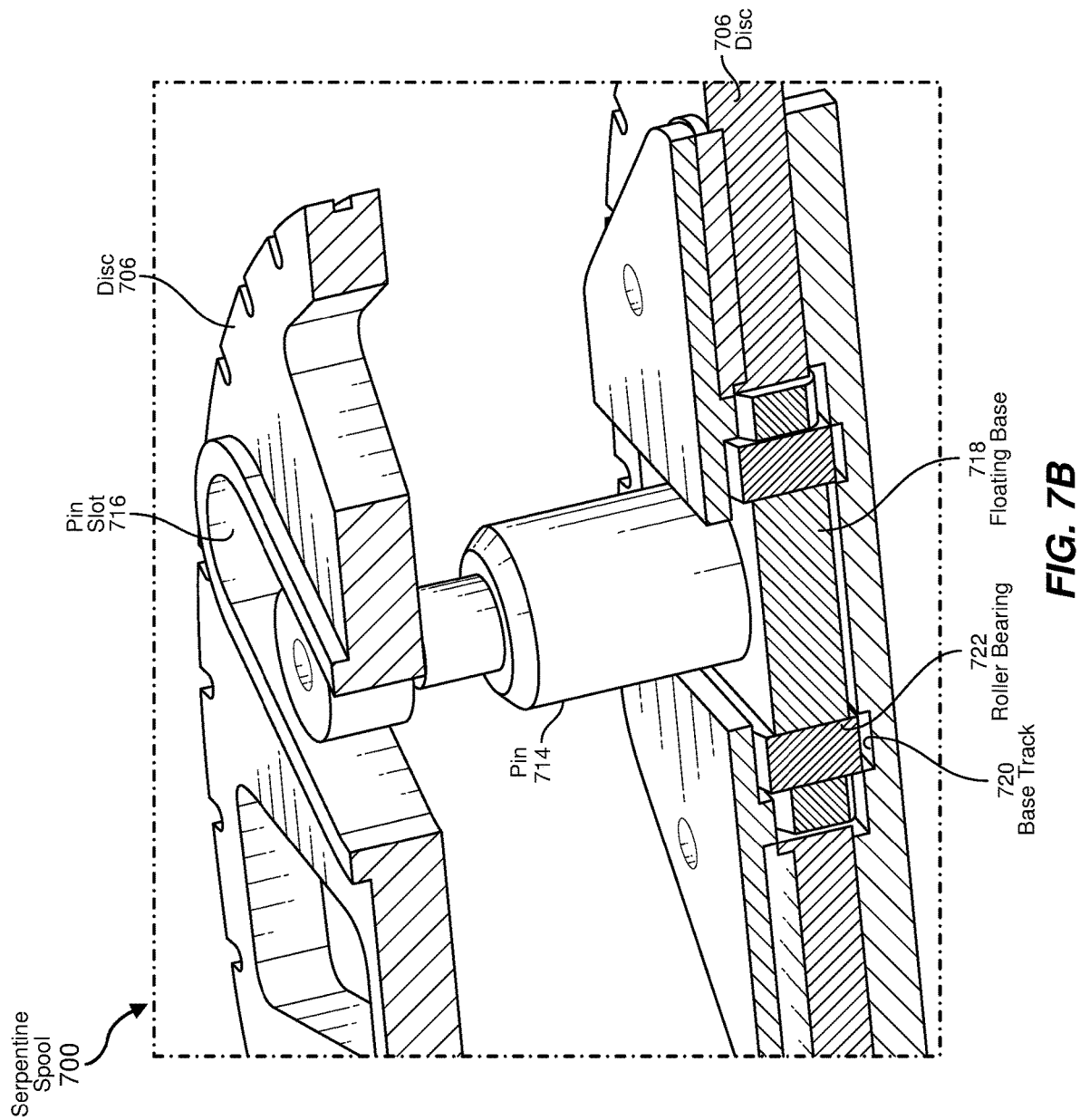

FIGS. 7A and 7B are two different views of an exemplary serpentine spool 700 employing a floating pin drive design in which a plurality of discs 706 are coupled by intervening disc interfaces 708. In a manner similar to that of serpentine spool 600, each disc 706 may include a cylindrical hub about which disc 706 may rotate, such as via a bearing or other cylindrical structure. Also, each disc 706 may be offset from a center of disc interface 708 such that the centers of discs 706 define a helical curve. In addition, each disc 706 may have a pin 714 movably attached to a side of disc 706 by way of a floating base 728 such that pin 714 extends perpendicularly toward the next disc 706. An end of pin 714 may then extend into a pin slot 716 of the next disc 706 to couple the adjacent discs 706 together. In some examples, pin 714 may include a wheel or other rotational mechanism received at pin slot 716 such that the rotational mechanism may roll against an edge of pin slot 716 to minimize friction therebetween. Moreover, pin slot 716 may be oriented radially from the center of disc 706 defining that pin slot 716.

As seen most readily in FIG. 7B, floating base 718 may include a plurality of bearings (e.g., roller bearings 722) that ride within one or more base tracks 720, thus allowing some amount of lateral movement of floating base 718, and thus pin 714, along a surface of associated disc 706.

As with serpentine spool 600, the periphery of discs 706 of serpentine spool 700, in some embodiments, may be covered by a flexible mesh or other material upon which fiber optic cable 112 may be loaded. In operation, rotating a disc 706 at one end of serpentine spool 700 may cause the remaining discs 706 to rotate in a corresponding manner via pins 714 and associated pin slots 716. As the discs rotate, each pin 714 may proceed along corresponding pin slot 716 to accommodate the offset arrangement of discs 706. Consequently, serpentine spool 700 may rotate independently of its revolving about powerline conductor 101 during fiber optic cable 112 installation.

FIGS. 8A-8D provide varying views of an exemplary installation system 800 including a serpentine spool (e.g., serpentine spool 400, 500, 600, or 700) of a spool subsystem (e.g., spool subsystem 204) and an associated motion subsystem (e.g., motion subsystem 202) for installing fiber optic cable 112 about powerline conductor 101. Depicted in FIGS. 8A-8D is a maximum loaded diameter 820 of serpentine spool instead of the serpentine spool directly to depict the presence of fiber optic cable 112 being loaded thereon. Also shown are spool flanges 806 at opposing ends of the serpentine spool that may serve to retain fiber optic cable 112 on the spool. Installation system 800 is shown positioned on powerline conductor 101. A conductor retainer 812 (e.g., a retractable wheel structure or other rotatable structure) may releasably clamp powerline conductor 101 to facilitate travel of installation system 800 along powerline conductor 101. In some examples, a conductor shroud 810 may be positioned along powerline conductor 101 to shield powerline conductor 101 from the serpentine spool and/or other components of installation system 800.

Figure 8A:
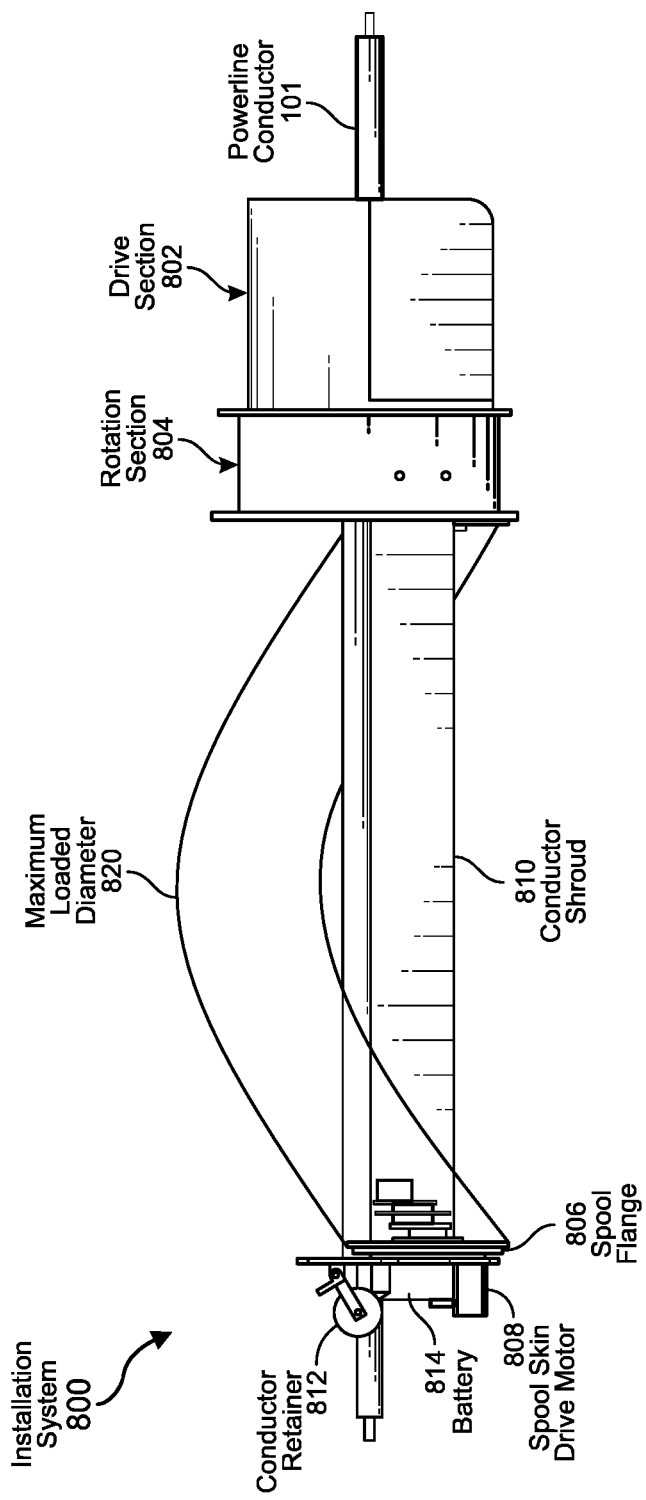
FIGS. 8A, 8B, 8C, and 8D are different views of an exemplary installation system including a serpentine spool and an associated motion subsystem for installing fiber optic cable about a powerline conductor.
Figure 8B:
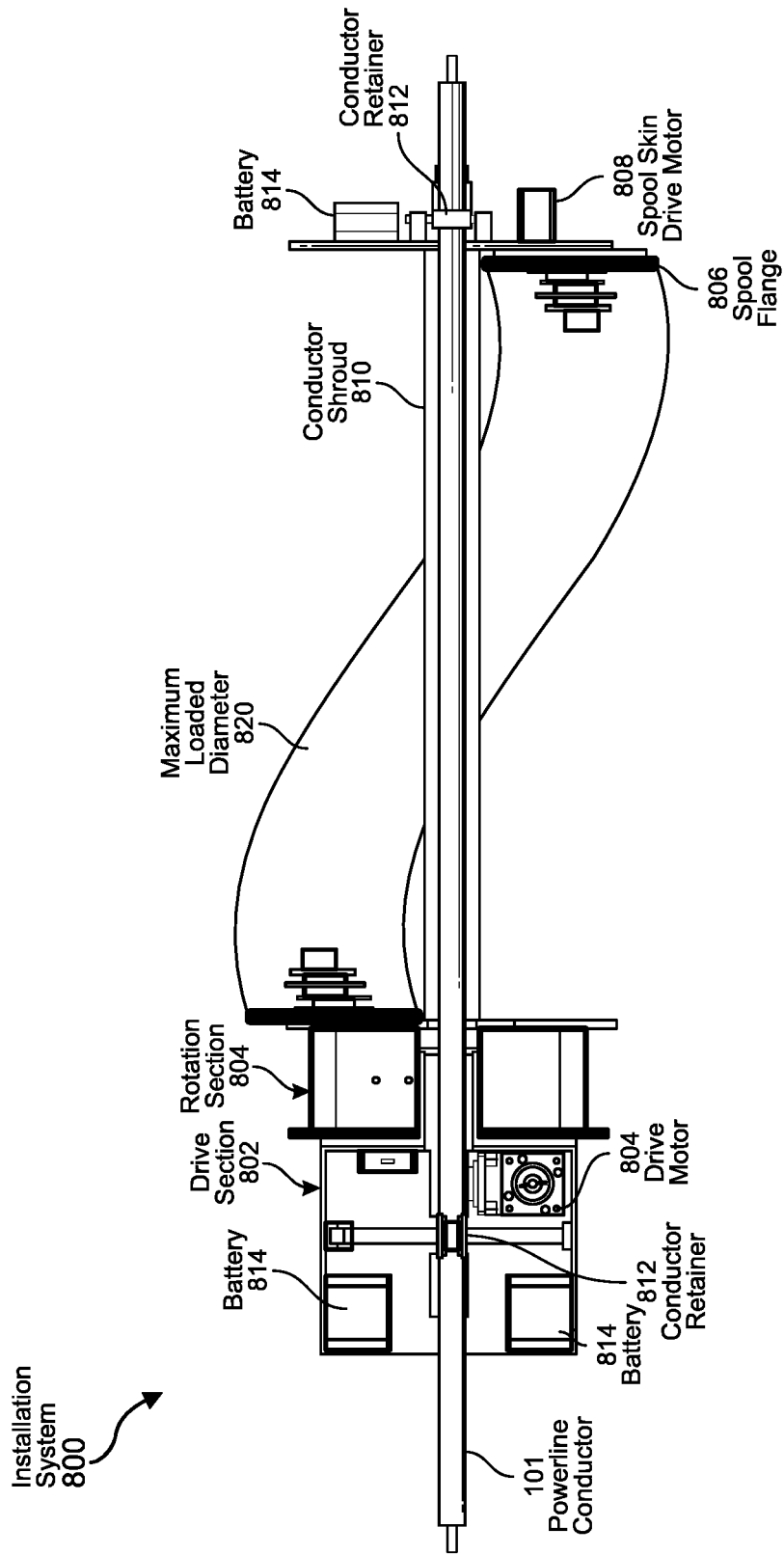
Figure 8C:
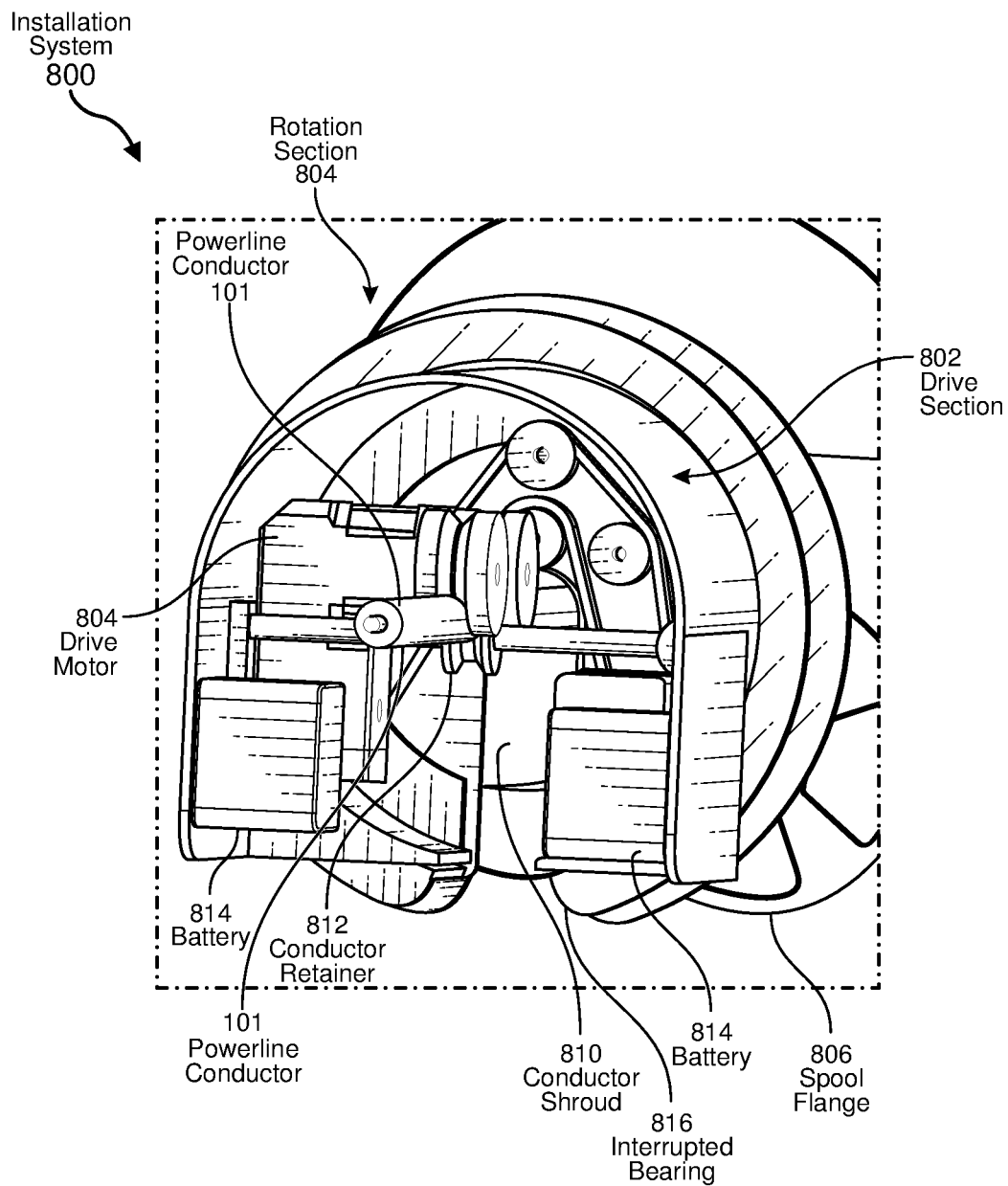
Figure 8D:
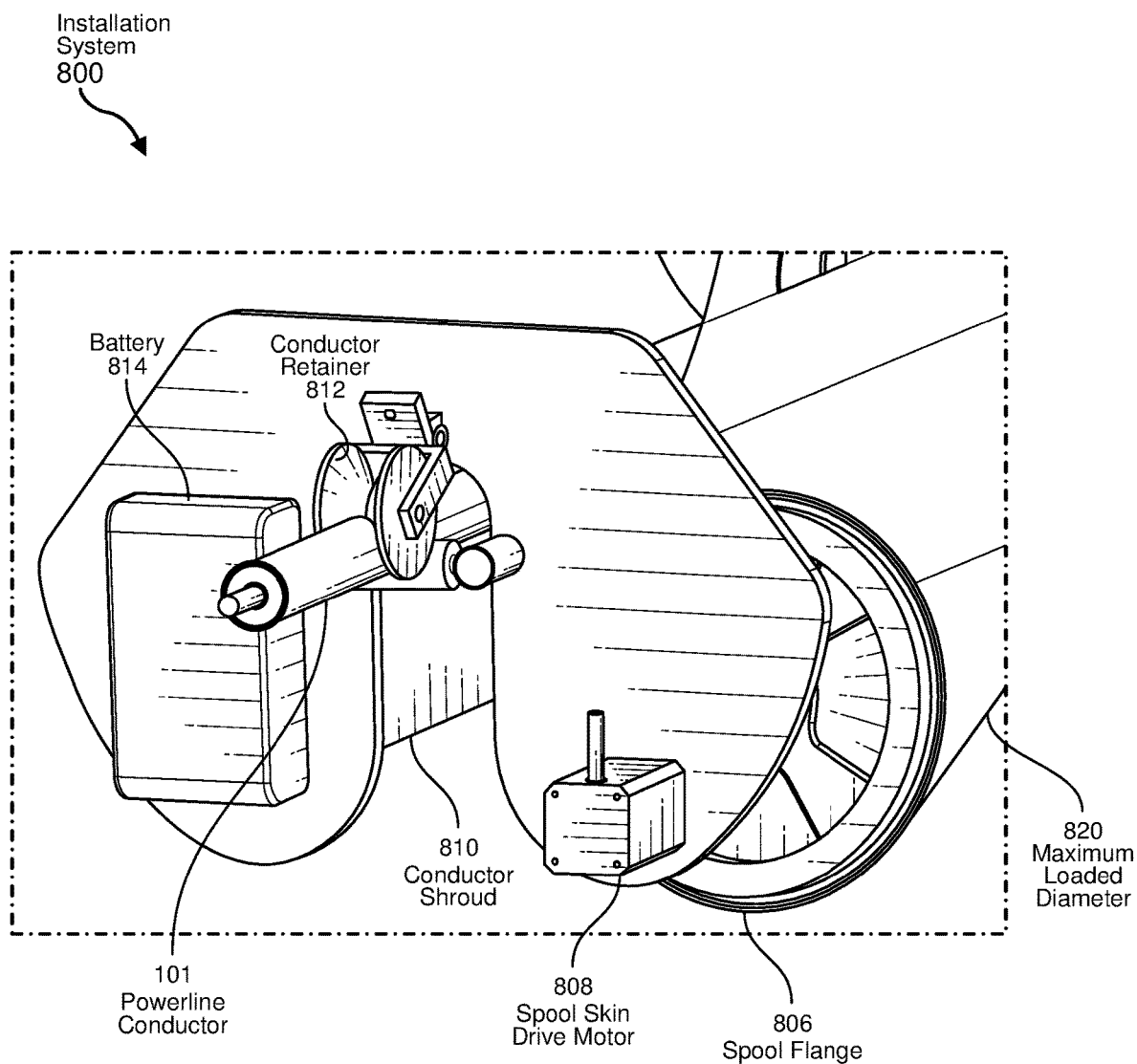
Figure 9A:
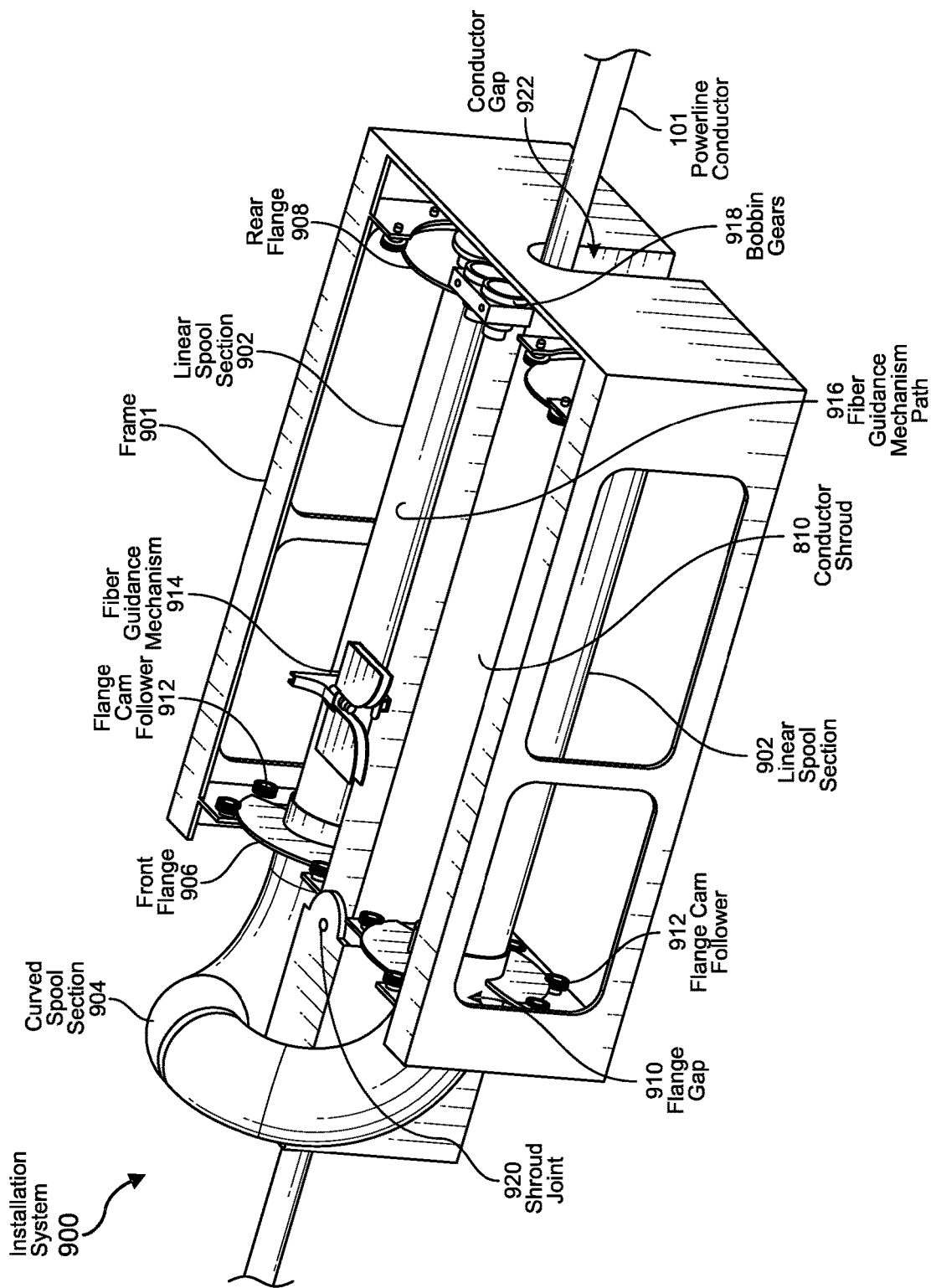
Figure 9C:
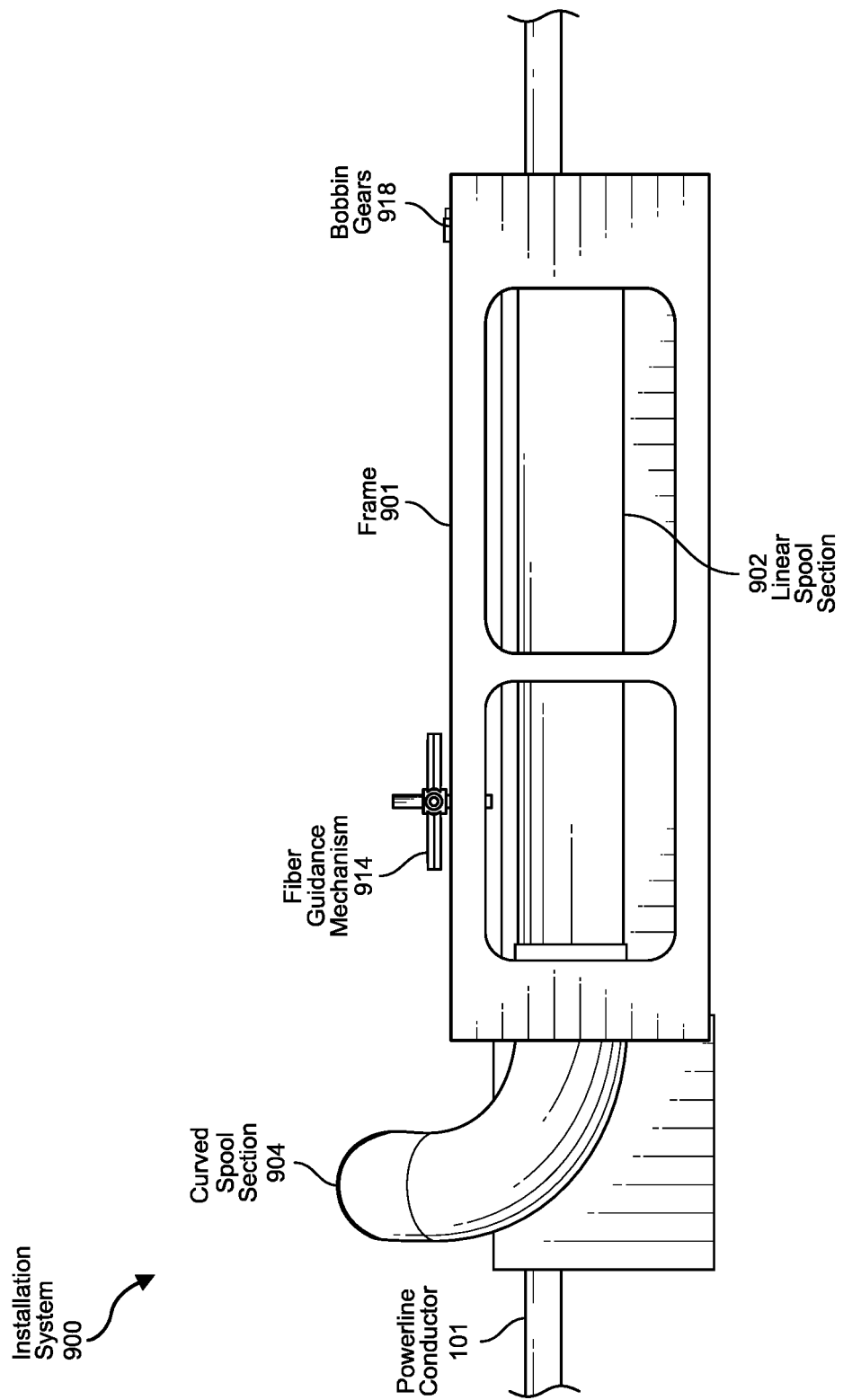
Figure 9D:
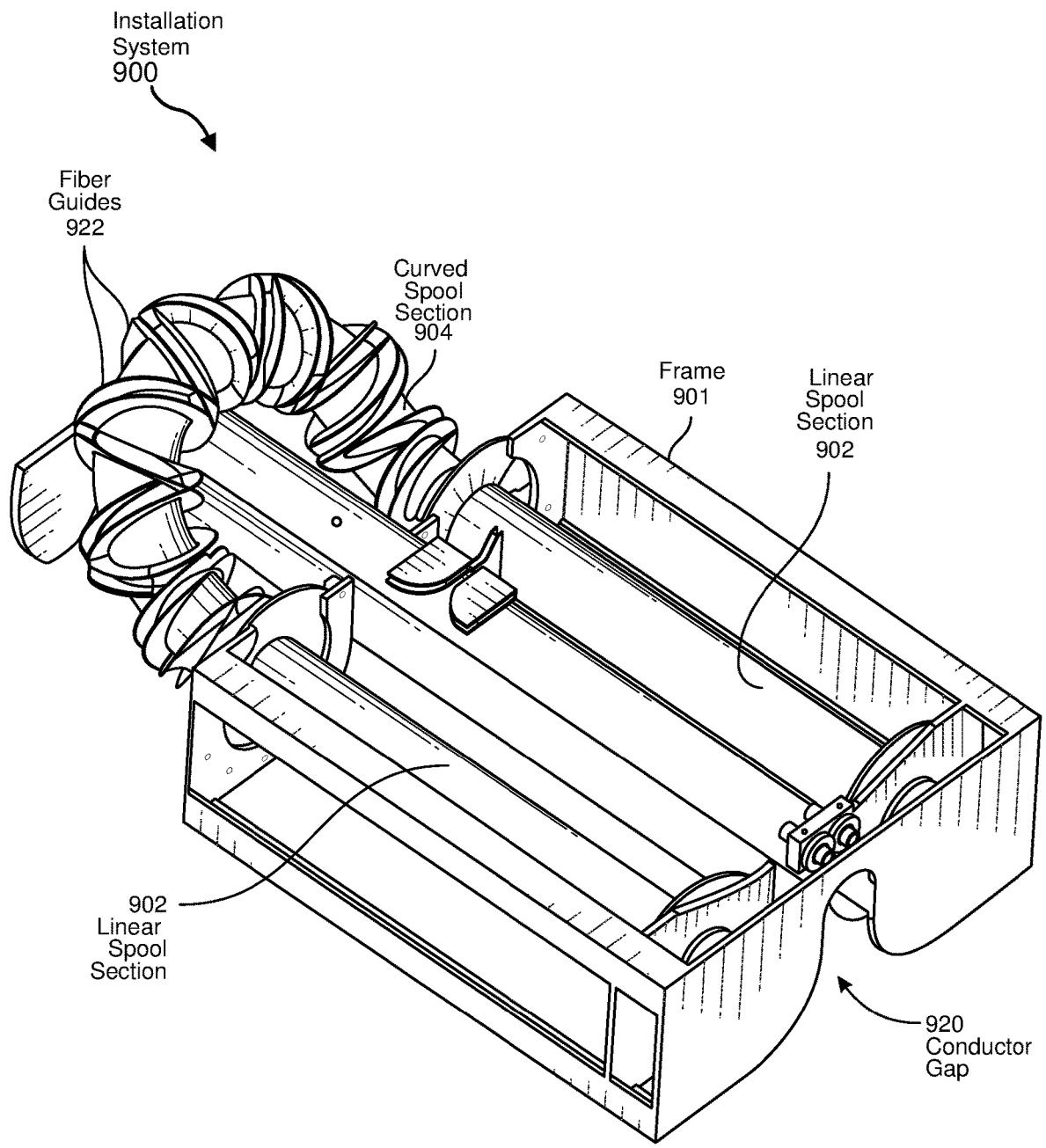

In some embodiments, installation system 800 may also include a drive section 802 and a rotation section 804 that may include portions of motion subsystem 202. For example, drive section 802 may contain a drive motor 805, along with drive wheels and/or other components for driving system 800 along powerline conductor 101. Rotation section 804, in some embodiments, may also employ a motor, pulleys, belts, and/or other components to revolve the spool about powerline conductor 101. In some examples, rotation section 804 may rotate about powerline conductor 101 to revolve the spool and associated flanges 806 about powerline conductor 101. This revolving may be accomplished using an interrupted bearing 816 that, when positioned vertically, as shown in FIG. 8C, may allow the loading of system 800 onto powerline conductor 101. Also, in some embodiments, drive motor 805 may be employed to cause system 800 to travel along powerline conductor 101 while revolving the spool.

At the opposite end of system 800 may reside a spool skin drive motor 808 (e.g., as part of motion subsystem 202) for rotating the spool about its own axis, as described above. In some examples, motor 808 may drive a mesh or other material about the surface of the spool or may drive a first disc or other component of the spool to perform the rotation, as described above.

As illustrated, multiple batteries 814, possibly located at both ends of installation system 800, may be distributed in such a manner to provide sufficient power for motion subsystem 202, processor 208, and sensor subsystem 206 while facilitating a degree of motion stability to system 800 during installation of fiber optic cable 112.

FIGS. 9A-9D are varying views of another installation system 900 that employs a spool having multiple linear sections and at least one non-linear section, as opposed to the serpentine spools described above. In these examples, the spool may include a curved (and possibly flexible) spool section 904 coupled at its ends to two linear (and possibly rigid) spool sections (or bobbins) 902 aligned substantially parallel to powerline conductor 101 to form a single, multiple-axis spool. As shown in FIGS. 9A-9D, curved spool section 904 may define a number of arcs that facilitate the coupling of linear spool sections 902. In some embodiments, linear spool sections 902 may be coupled to a frame 901 by way of front flanges 906 and rear flanges 908 and a plurality of flange cam followers 912. More specifically, each flange 906 and 908 may be rotatably coupled to frame 901 by multiple flange cam followers 912 so that linear spool sections 902 and curved spool section 904 may rotate as a unit while flanges 906 and 908 are supported in frame 901. In some examples, a spool motor (not shown in FIGS. 9A-9D), may rotate the spool by way of bobbin gears 918. Further, in some embodiments, bobbin gears 918, when driven by a motor, may cause linear spool sections 902 to rotate at an identical rate in opposite directions, which in turn may cause curved spool section 904 to rotate at that same rate. This rotation, as indicated in other embodiments above, may allow fiber optic cable 112 to be loaded and/or unloaded from the spool.

In some embodiments, frame 901 may define a conductor gap 922 through which powerline conductor 101 may be inserted to facilitate placement of installation system 900 thereon for installation of fiber optic cable 112. System 900 may include conductor shroud 810 attached to frame 901 that may serve to isolate powerline conductor 101 from the spool, as well as to provide a mounting structure for a fiber guidance mechanism 914. In some examples, frame 901 and/or conductor shroud 810 may include one or more joints, such as shroud joint 920, (e.g., forming a spine joint) to allow that portion of system 900 to bend while travelling along powerline conductor 101. In some examples, fiber guidance mechanism 914 may guide fiber optic cable 112 onto the spool and/or from the spool onto powerline conductor 101. As indicated in other embodiments, a tension sensor may be included in system 900, the data from which may be employed to control the level of tension maintained in fiber optic cable 112 during installation.

In some embodiments, the curvature of curved spool section 904 may be designed to maximize the radius of the curvature while clearing conductor shroud 810. Also in some embodiments, curved spool section 904 may include three arcs of radius equal to the distance between the center of powerline conductor 101 and the center of each of linear spool sections 902. For example, a first arc and a third arc may each curve by 45 degrees, oriented with one end coupled to front flange 906 of linear spool section 902 and with the other end elevated above the horizontal plane defined by powerline conductor 101 in line with linear spool section 902. A second arc may be a 180-degree curved section coupling the open ends of the first and third arcs.

As shown in FIGS. 9A-9D, fiber guidance mechanism 914, in some embodiments, may include a guide with a pair of curved surfaces placed next to each other, a guide tube, and/or other components to guide fiber optic cable 112 to the spool during loading and/or from the spool to powerline conductor 101 during installation. In some examples, the guide may move along a top of conductor shroud 810 and may face either linear spool section 902 or curved spool section 904 for the loading or unloading of fiber optic cable 112. To that end, in some embodiments, fiber guidance mechanism 914 may include a pair of sprockets, one near either end of conductor shroud 810, with a loop of chain coupling the sprockets. In such examples, the guide may be attached to the chain by a vertically-oriented swivel joint that causes the guide to face outward toward the nearest of linear spool sections 902 and curved spool section 904 as the guide is moved by the chain along conductor shroud 810. In some examples, when moving the guide about the sprocket near curved spool section 904, fiber guidance mechanism 914 may naturally increase the speed of a delivery end of the guide when loading or unloading fiber optic cable 112 over curved spool section 904. Consequently, in some embodiments, the wrapping density of curved spool section 904 may be significantly less than that of either linear spool section 902, thus decreasing the weight imposed by fiber optic cable 112 onto curved spool section 904.

In some embodiments, curved spool section 904 may include a pair of fiber guides 924, one wound helically in one orientation (e.g., clockwise or counterclockwise) coupling a first linear spool section 902 to a second linear spool section 902, and another wound helically in the opposite orientation to couple the second linear spool section 902 to the first linear spool section 902. In some embodiments, fiber guide paths 924 may enforce a lesser wrapping density on curved spool section 904 than that employed on linear spool sections 902, as noted above, thus reducing the number of points of intersection of counter propagating fiber guide paths 924. Also, in some examples, the packing density of fiber guide paths 924 may be selected such that a difference in guide length of outer and inner fiber guide paths 924 between two consecutive intersection points is minimized. In one example, sixteen intersection points may be employed and evenly distributed along curved spool section 904.

In some embodiments, curved spool section 904 may include a flexible tube upon which fiber guide paths 924 rest directly, with the flexible tube having an outer diameter approximately equal to the outer diameter of linear spool sections 902. Further, the flexible tube may be supported over a rigid spine with a smaller outer diameter than the flexible tube but having substantially the same arc curvature as the flexible tube. Additionally, in some examples, the flexible tube may be supported by spokes riding on bearings. In other embodiments, instead of employing the flexible tube, curved spool section 904 may include a flexible conduit or similar structure with an outer diameter significantly less than that of linear spool sections 902. Such a conduit may include a series of posts emanating perpendicularly or radially from the surface of the conduit (e.g., with each post facing 180 degrees opposite another post, and with an inter-post spacing that matches the intersection points of fiber guide paths 924. In such examples, fiber guide paths 924 may be coupled to each other and to the ends of the posts. Further, in some embodiments, the ends of the flexible conduit may be connected to front flanges 906 such that rotation of at least one linear spool section 902 rotates the flexible conduit, which in turn rotates fiber path guides 924.

In some examples, each of front flanges 906 may define a flange gap 910 such that, when loading or unloading fiber optic cable 112 to or from the spool, fiber guidance mechanism 914 may guide or pass fiber optic cable 112 from rear flange 908 of the first linear spool section 902, through flange gap 910 of front flange 906 of the first linear spool section 902, onto a first fiber guide 924 of curved spool section 904, through flange gap 910 of front flange 906 of the second linear spool section 902, to rear flange 908 of the second linear spool section 902, and then back again, using the second fiber guide 924. In some examples, the opposing orientation of fiber guides 924 may facilitate the winding of fiber optic cable 112 back and forth along the spool while rotating the spool in the same direction throughout. Additionally, in some embodiments, each of front flanges 906 may define a second flange gap (e.g., located opposite flange gap 910) through which fiber optic cable 112 may be passed.

In some examples, a drive/rotation section (not shown in FIGS. 9A-9D) may include various components of motion subsystem 202, including a motor, batteries (e.g., batteries 210), wheels, and other components (e.g., similar to installation system 800) to facilitate the travel of installation system 900 along powerline conductor 101 (e.g., with drive/rotation section possibly being the leading end of system 900) while revolving system 900 about powerline conductor 101 to wrap fiber optic cable 112 from the spool onto powerline conductor 101. In addition, in some examples, one or more additional batteries may be placed on frame 901 near rear flanges 908 to provide additional electrical power while providing a more balanced weight for installation system 900 when travelling along powerline conductor 101.

Figure 10:
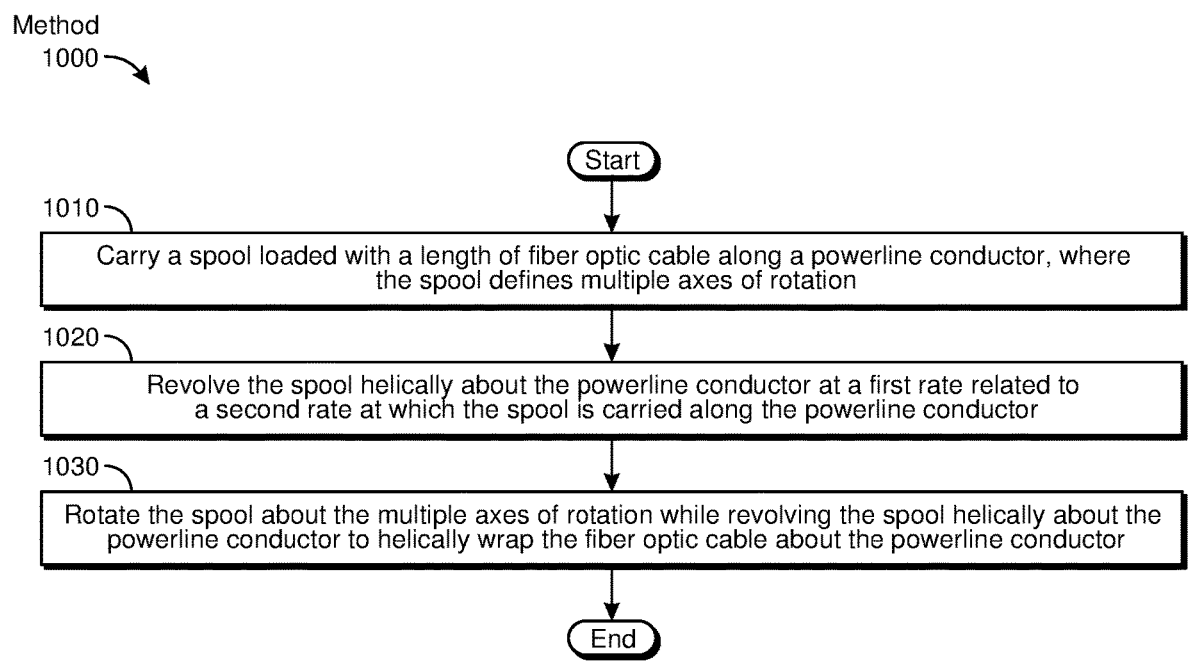
FIG. 10 is a flow diagram of an exemplary method of installing fiber optic cable about preexisting electrical power infrastructure, such as a powerline conductor.

FIG. 10 is a flow diagram of an exemplary method of installing fiber optic cable onto preexisting electrical power infrastructure (e.g., powerline conductor 101). Such a method may be performed using the various systems (e.g., systems 200, 800, and 900) and components described above. At step 1010, for example, a spool (e.g., serpentine spool 300, 400, 500, 600, or 700, or the spool of installation system 900) loaded with a length of fiber optic cable (e.g., fiber optic cable 112) may be carried along the powerline conductor, where the spool defines multiple axes of rotation, as described above.

At step 1020, the spool may be helically revolved about the powerline conductor at a first rate related to a second rate at which the spool is carried along the powerline conductor. Further, at step 1030, while the spool is being revolved about the powerline conductor, the spool is rotated about its multiple axes of rotation to helically wrap the fiber optic cable about the powerline conductor. Consequently, in some examples, the rate at which the fiber optic cable is wrapped about the powerline conductor per length of the powerline conductor may remain substantially constant.

The steps of method 1000 may be performed or controlled in part by any suitable computer-executable code and/or processing system (e.g., processor 208), as described above. In some examples, each of the steps of method 1000 may represent an algorithm whose structure includes and/or is represented by multiple sub-steps, examples of which are described above in greater detail.

As explained above in conjunction with FIGS. 1-10, the apparatuses, systems, and methods described herein may facilitate the helical wrapping of long segments of fiber optic cable onto a powerline conductor in an automatic or semi-automatic manner. Consequently, in some examples, the use of fiber optic cable as a communication medium may be greatly expanded via preexisting electrical power infrastructure to include many geographic areas not currently served, and the number of fiber splices needed to cover significantly long distances within such areas may be significantly reduced.

As detailed above, processors employed in the systems described and/or illustrated herein broadly represent any type or form of computing device or system capable of executing computer-readable instructions. In their most basic configuration, these processors may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a spool that carries a length of fiber optic cable to be installed on a powerline conductor, wherein the spool defines multiple axes of rotation; and
   a motion subsystem that carries the spool, wherein the motion subsystem:
   causes the system to travel along the powerline conductor;
   revolves the spool helically about the powerline conductor at a first rate related to a second rate at which the system travels along the powerline conductor; and
   rotates the spool about the multiple axes of rotation while revolving the spool helically about the powerline conductor to helically wrap the fiber optic cable about the powerline conductor.

2. The system of claim 1, wherein the motion subsystem rotates the spool about the multiple axes of rotation to maintain a predetermined tension on the fiber optic cable while helically wrapping the fiber optic cable about the powerline conductor.

3. The system of claim 1, wherein at least one of the multiple axes of rotation is parallel to at least a portion of the powerline conductor currently being travelled along by the system.

4. The system of claim 1, wherein the motion subsystem rotates about the powerline conductor as the motion subsystem causes the system to travel along the powerline conductor to revolve the spool about the powerline conductor.

5. The system of claim 1, wherein the motion subsystem revolves the spool about the powerline conductor while the motion subsystem maintains a single orientation relative to the powerline conductor.

6. The system of claim 1, wherein the spool comprises a helically-shaped spool extending along the powerline conductor and defining a helical curve about the powerline conductor.

7. The system of claim 6, wherein the helical curve spans at least 180 degrees about the powerline conductor.

8. The system of claim 6, wherein the spool comprises:
a flange at each end of the spool to retain the fiber optic cable on the spool; and
a plurality of discs coupling the flanges together, wherein:
the plurality of discs are oriented parallel to each other and perpendicular to the powerline conductor; and
centers of the plurality of discs define the helical curve about the powerline conductor.

9. The system of claim 8, wherein the plurality of discs are coupled together such that rotating a first one of the plurality of discs causes others of the plurality of discs to rotate at a same rate as the first one of the plurality of discs.

10. The system of claim 1, wherein the spool comprises at least one linear spool section oriented parallel to the powerline conductor.

11. The system of claim 1, wherein the spool comprises:
a first linear spool section oriented parallel to the powerline conductor;
a second linear spool section oriented parallel to the powerline conductor and located opposite the powerline conductor from the first linear spool section; and
a center curved spool section coupling a first end of the first linear spool section to a first end of the second linear spool section.

12. The system of claim 11, wherein the motion subsystem causes the system to travel along the powerline conductor in a direction corresponding to the center curved spool section.

13. The system of claim 11, wherein:
the first linear spool section comprises:
a first flange connected to the first end of the first linear spool section; and
a second flange connected to a second end of the first linear spool section opposite the first end of the first linear spool section;
the second linear spool section comprises:
a third flange connected to the first end of the second linear spool section; and
a fourth flange connected to a second end of the second linear spool section opposite the first end of the second linear spool section; and
the system further comprises a frame, wherein the first and second linear spool sections are rotatably coupled to the frame via the first, second, third, and fourth flanges.

14. The system of claim 13, wherein:
the center curved spool section is fixably coupled to the first end of each of the first and second linear spool sections; and
the motion subsystem rotates the first and second linear spool sections at a same rotational rate in opposing directions.

15. The system of claim 14, wherein:
the first flange defines a first gap through which the fiber optic cable is passed between the first linear spool section and the center curved spool section; and
the third flange defines a second gap through which the fiber optic cable is passed between the second linear spool section and the center curved spool section.

16. The system of claim 15, further comprising:
a first fiber guide helically wound about the center curved spool section to guide the fiber optic cable over the center curved spool section from the first linear spool section to the second linear spool section; and
a second fiber guide helically wound about the center curved spool section to guide the fiber optic cable over the center curved spool section from the second linear spool section to the first linear spool section; and
wherein the first and second fiber guides are helically wound about the center curved spool section in opposing directions.

17. A system comprising:
a motion subsystem that causes the system to travel along a powerline conductor; and
a coupler that releasably couples, to the motion subsystem, a spool that carries a length of fiber optic cable to be installed on the powerline conductor, wherein the spool defines multiple axes of rotation; and
wherein the motion subsystem, when the spool is coupled to the motion subsystem:
revolves the spool helically about the powerline conductor at a first rate related to a second rate at which the system travels along the powerline conductor; and
rotates the spool about the multiple axes of rotation while revolving the spool helically about the powerline conductor to helically wrap the fiber optic cable about the powerline conductor.

18. The system of claim 17, wherein the motion subsystem revolves the spool relative to the motion subsystem to revolve the spool about the powerline conductor.

19. The system of claim 17, wherein the motion subsystem rotates relative to the powerline conductor to revolve the spool about the powerline conductor.

20. A method comprising:
carrying a spool loaded with a length of fiber optic cable to be installed on a powerline conductor along the powerline conductor, wherein the spool defines multiple axes of rotation;
revolving the spool helically about the powerline conductor at a first rate related to a second rate at which the spool is carried along the powerline conductor; and
rotating the spool about the multiple axes of rotation while revolving the spool helically about the powerline conductor to helically wrap the fiber optic cable about the powerline conductor.

* * * * *